(12) United States Patent
Kondo et al.

(10) Patent No.: US 8,513,907 B2
(45) Date of Patent: Aug. 20, 2013

(54) POWER CONVERTER FOR ELECTRIC ROTATING MACHINE

(75) Inventors: Taizo Kondo, Chiryu (JP); Masakazu Tago, Aisai (JP); Harumi Horihata, Nagoya (JP)

(73) Assignee: Denso Corporation, Kariya (JP)

( * ) Notice: Subject to any disclaimer, the term of this patent is extended or adjusted under 35 U.S.C. 154(b) by 544 days.

(21) Appl. No.: 12/833,476

(22) Filed: Jul. 9, 2010

(65) Prior Publication Data

US 2011/0006710 A1    Jan. 13, 2011

(30) Foreign Application Priority Data

Jul. 9, 2009  (JP) ................................ 2009-162448

(51) Int. Cl.
*H02P 6/14*  (2006.01)

(52) U.S. Cl.
USPC ............. 318/400.27; 318/400.35; 318/400.34

(58) Field of Classification Search
USPC ................. 318/400.27, 400.35, 400.34, 787, 318/788, 400.01, 400.4, 376, 139, 599
See application file for complete search history.

(56) References Cited

U.S. PATENT DOCUMENTS

| 2008/0225565 A1 | 9/2008 | Tsujimoto et al. |
| 2012/0098556 A1* | 4/2012 | Miyazaki ................. 324/750.01 |

FOREIGN PATENT DOCUMENTS

| CN | 101001076 A | 7/2007 |
| JP | A-9-312989 | 12/1997 |
| JP | A-11-155297 | 6/1999 |
| JP | B2-3239426 | 12/2001 |
| JP | A-2004-7964 | 1/2004 |
| JP | A-2005-204383 | 7/2005 |
| JP | A-2008-228450 | 9/2008 |

OTHER PUBLICATIONS

U.S Appl. No. 12/976,026 in the name of Taizo Kondo et al.
Office Action issued in Chinese Patent Application No. 201010226039.7 dated May 9, 2012 (with translation).
Dec. 21, 2012 Office Action issued in Japanese Application No. 2010-155568 (with translation).

* cited by examiner

*Primary Examiner* — Karen Masih
(74) *Attorney, Agent, or Firm* — Oliff & Berridge, PLC

(57) ABSTRACT

A power converter for an electric rotating machine is provided which is designed to ensure a desired length of a current flywheel duration in which current is permitted to freewheel from the electric rotating machine even if the power converter is in a transient state or subjected to an unexpected change. The power converter is equipped with a controller and a switching circuit which is disposed between a power supply and windings of the electric rotating machine. The switching circuit has switches grouped into an upper and a lower arm. The controller works to control an off-operation of one of the switches of one of the upper and lower arm so as to produce a desired length of the current flywheel duration following turning off of the one of the switches, thereby minimizing a loss of rectification and avoiding the backflow of current from the power supply to the windings.

24 Claims, 9 Drawing Sheets

POWER CONVERTER FOR ELECTRIC ROTATING MACHINE

CROSS REFERENCE TO RELATED DOCUMENT

The present application claims the benefit of priority of Japanese Patent Application No. 2009-162448 filed on Jul. 9, 2009, the disclosure of which is incorporated herein by reference.

BACKGROUND OF THE INVENTION

1. Technical Field of the Invention

The present invention relates generally to a power converter for an electric rotating machine which is equipped with a switching circuit and a controller, and more particular to such a power converter designed to ensure improved reliability in operation when the power converter is in a transient state or subjected to an unexpected change.

2. Background Art

Japanese Patent First Publication No. 2004-7964, assigned to the same assignee as that of this application, discloses an inverter for a three-phase motor generator and teaches a technique of setting an off-time of a MOS transistor for one of phases which is the time when the MOS transistor is to be turned off (i.e., after advance of 120° in electrical angle) based on an on-time of a MOS transistor for another phase which is the time when the MOS transistor is to be turned off and regarding the off-timing by a maximum of 60° in electrical angle based on the speed of the motor generator or a duty cycle of a pulse signal for switches of a field current controller.

The above system changes an on-duration of the MOS transistor between 120° to 180° in electrical angle. The range of this change is determined as a function of the speed of the motor generator or the duty cycle of the switches of the field current controller in the feedforward mode. This control, however, has a difficulty in setting the on-duration of the MOS transistor accurately when the system is in a transient state or dealing with an unexpected change such as an aged deterioration in characteristic of the system or a change in ambient temperature, which results in unwanted shift in the off-time. For example, when the system is in the transient state, the off-time may be changed due to effects of a time constant of an excited coil regardless of the duty cycle of the switches of the field current controller. When the unexpected change has occurred, it also results in unwanted shift in the off-time. The advancement of the off-time usually leads to an increased loss in rectification in the inverter. Conversely, the delay of the off-time results in backflow of current from a power supply to windings of the motor generator. In other words, the duration in which current freewheels to the MOS transistors working as rectifying devices is susceptible to change, thus resulting in deterioration of reliability in operation of the system.

SUMMARY OF THE INVENTION

It is therefore a principal object of the invention to avoid the disadvantages of the prior art.

It is another object of the invention to provide an improved structure of a power converter for an electric rotating machine which is designed to keep a current freewheeling duration constant, thereby ensuring the reliability in operation of the power converter when the power converter is in a transient state or subjected to an unanticipated change.

According to one aspect of the invention, there is provided a power converter for an electric rotating machine such as a motor-generator for use in automotive vehicles. The power converter comprises: (a) a switching circuit disposed between a power supply and a phase winding of an electric rotating machine, the switching circuit being equipped with switches grouped into an upper arm and a lower arm; and (b) a controller which controls on- and off-operations of the upper and lower arms. The controller controls the off-operation of one of the upper and lower arms to set a current flywheel duration, in which flywheel current that is current freewheeling from the electric rotating machine is permitted to flow from the electric rotating machine and which is a time length between when phase voltage induced at the phase winding exceeds a first threshold value and when the phase voltage drops below a second threshold value, to a selected time length following the off-operation of the one of the upper and lower arms.

The electric rotating machine is not limited to only an electric generator. A motor-generator may also be used as the electric rotating machine. The number of the upper and lower arms depends upon the number of phases of the electric rotating machine. The electric rotating machine may have a single phase, two phases, or three or more phases. The switches may be each implemented by a FET (e.g., a MOSFET, a JFET, or a MESFET), a IGBT, a GTO, or a power transistor. The current flywheel duration represents a period of time in which the current freewheels due to voltage (i.e., a counter electromotive force) induced at the phase winding when the switch is controlled in on-off operation. The current flywheel duration may be set for the whole of the power converter or for each of the phases. The flywheel current may pass through a parasitic diode made by a P-N junction in the switch, a rectifying device (i.e., a freewheel diode) connected in parallel to the switch, or a snubber circuit connected in parallel to the switch. The values of the first threshold value and the second threshold value defining the beginning and end of the current flywheel duration depend upon usage conditions (e.g., the type of the electric rotating machine, the purpose of use of the electric rotating machine, the number of phases of the electric rotating machine, the type of the switches, or the presence of the rectifying device or the snubber circuit connected in parallel to the switch). The magnitude relation between the first and second threshold values may depend upon the usage conditions. The first threshold value may be greater or smaller than the second threshold value.

The power converter of the invention, as described above, works to control the off-operation of one of the arms so as to keep the current flywheel duration at a desired length which is provided following the off-operation of the one of the arms, thereby ensuring the accuracy in setting the time at which the other arm will be subsequently controlled in the on-off operation. This minimizes a loss of the rectification and avoids the backflow of current from the power supply to the phase winding.

In the preferred mode of the invention, when the phase voltage reaches a third threshold value and then reaches a fourth threshold value, the controller may turn on the one of the upper and lower arms. The magnitude relation between the third and fourth threshold values depends upon the usage conditions. The controller works to turn off the arm without use of the angular position of and the current in the electric rotating machine, thus eliminating the need for sensors to measure the angular position of and the current in the electric rotating machine. This results in a decrease in production cost of the power converter as well as a decrease in loss of the rectification and also avoids the backflow of current from the power supply to the phase winding.

When the phase current reaches a fifth threshold value, the controller may turn on the one of the upper and lower arms. The fifth threshold value may be determined depending upon the usage conditions. If the controller does not turn on the one of the arms when the phase current has reached the fifth threshold value, it results in an increase in loss of the rectification and backflow of current from the power supply to the phase winding. The above operation of the controller alleviates such problems.

When an angular position of the electric rotating machine reaches a given position, the controller may turn on the one of the upper and lower arms. A position sensor such as a resolver or a rotary encoder may be used to measure the angular position of the electric rotating machine. The angular position may alternatively be calculated mathematically using an output from another sensor. If a reference angular position (e.g., an electric angle of zero (0)) of the electric rotating machine is known, the angular position may be derived as a function of the time elapsed from when the electric rotating machine passes through the reference angular position. If the controller does not turn on the one of the arms when the angular position of the electric rotating machine has reached the given position, it results in an increase in loss of the rectification and backflow of current from the power supply to the phase winding. The above operation of the controller alleviates such problems.

The power converter may further include a position sensor which works to measure the angular position of the electric rotating machine and output a signal indicative thereof. The controller may turn off the one of the upper and lower arms based on the output from the position sensor. For example, when the angular position of the electric rotating machine, as measured by the position sensor, has reached one of 0°, 120°, and 240° in electric angle, the controller turns off the one of the upper and lower arms to ensure the current flywheel duration subsequently. If an unexpected change, e.g., a sudden change in speed occurs in the electric rotating machine, but the controller turns off the one of the arms at a regular time, it may result in delay in start time of the current flywheel duration, which leads to a failure in ensuring a desired length of the current flywheel duration. The above operation of the controller alleviates such a problem, thus minimizing a loss of the rectification and avoiding the backflow of current from the power supply to the phase winding regardless of the operating condition of the electric rotating machine.

The power converter may further include a current sensor which works to measure a phase current produced in the phase winding and output a signal indicative thereof. The controller may turn off the one of the upper and lower arms based on an output from the current sensor. If an unexpected change, e.g., a sudden change in speed occurs in the electric rotating machine, but the controller turns off the one of the arms at a regular time, it may result in delay in start time of the current flywheel duration, which leads to a failure in ensuring a desired length of the current flywheel duration. The above operation of the controller alleviates such a problem, thus minimizing a loss of the rectification and avoiding the backflow of current from the power supply to the phase winding regardless of an electric load on the electric rotating machine.

The controller may determine a length of the current flywheel duration based on at least one of a speed, a phase current, or the phase voltage of the electric rotating machine. Specifically, the controller derives a desired length of the current flywheel duration regardless of the first and second threshold values. For example, the controller may increase or decrease the current flywheel duration, as determined by the first and second threshold value. Alternatively, if the current flywheel duration is not yet provided, the controller newly determines a required length of the current flywheel duration as a function of at least one of the speed, the phase current, or the phase voltage of the electric rotating machine. This minimizes the loss of the rectification and avoids the backflow of current from the power supply to the phase winding, which leads to improved reliability in operation of the power converter.

When at least one of the speed, the phase current, or the phase voltage of the electric rotating machine falls out of a permissible range, the controller may turn off the one of the upper and lower arms immediately or after elapse of a given period of time. The permissible range may be determined by upper and lower limits of a change in speed, phase current, or phase voltage per unit time or a permissible value thereof per unit time. The given period of time may be determined depending upon the usage condition, as described above. The above operation of the controller minimizes the loss of the rectification and avoids the backflow of current from the power supply to the phase winding.

The controller places the upper and lower arms in an off-state unless current, as generated in the phase winding, is greater than a given value. In other words, when the generated current becomes greater than the given value, the controller starts switching the upper and lower arms, thereby ensuring the stability in the control of the electric rotating machine.

The controller monitors the phase voltage. When the phase voltage has an unusual value, the controller may turn off a corresponding portion or all of the upper and lower arms to initialize the power converter, thereby avoiding a failure in controlling the arms to improve the reliability in operation of the power converter.

The controller may monitor a sequence of one of the on-operations and the off-operations of the switches of the upper and lower arms. When the monitored sequence is an unusual sequence, the controller may turn off a corresponding portion or all of the upper and lower arms to initialize the power converter, thereby avoiding a failure in controlling the arms to improve the reliability in operation of the power converter.

The controller may turn off the one of the upper and lower arms based on the current flywheel duration. This eliminates the need for a sensor which measures the angular position of or current in the electric rotating machine, thus minimizing the production cost of the power converter and the loss of the rectification, and avoids the backflow of current from the power supply to the phase winding.

When the current flywheel duration is not provided, the controller may turn off the one of the upper and lower arms earlier than time to be calculated based on the current flywheel duration. In other words, when the current flywheel duration is not yet determined, the controller turns off the one of the arms earlier than the time when the phase voltage reaches the first threshold value, that is, the beginning of the current flywheel duration to be specified by the first and second threshold values. This ensures a period of time in which the flywheel current is permitted to flow and which is longer than the length of the current flywheel duration.

According to the second aspect of the invention, there is provided a power converter for a multi-phase electric rotating machine which comprises: (a) a switching circuit disposed between a power supply and phase windings of an electric rotating machine, the switching circuit being equipped with switches grouped into an upper arm and a lower arm for each of the phase windings; and (b) a controller which controls on- and off-operations of each of the switches of the upper and lower arms. The controller controls the off-operation of one of the switches of one of the upper and lower arms to set a current flywheel duration in which flywheel current that is current freewheeling from the electric rotating machine is permitted to flow from the electric rotating machine and which is a time length between when a phase voltage induced at a target one of the phase windings which is associated with the one of the switches targeted for the off-operation exceeds a first threshold value and when the phase voltage drops below a second threshold value, to a selected time length following the off-operation of the one of the switches. When the phase voltage reaches a third threshold value and then reaches a fourth threshold value, the controller turns on the one of the switches.

In the preferred mode of the invention, the controller may turn off the one of the switches based on a first delay time from when a target switch that is one of the switches of one of phases which is targeted for the off-operation or a non-target switch that is one of the switches of another of the phases which is non-targeted for the off-operation has been turned on.

The controller may turn off the one of the switches based on the current flywheel duration set for one of the phases associated with the one of the switches.

The controller may turn off the one of the switches based on the current flywheel duration set for a non-target switch that is one of the switches non-targeted for the off-operation.

The controller may turn off the one of the switches after elapse of a second delay time from when a non-target switch that is one of the switches which is now non-targeted for the off-operation was turned off.

The controller may determine the length of the current flywheel duration based on at least one of a speed, a phase current, or the phase voltage of the electric rotating machine.

When at least one of a speed, a phase current, or the phase voltage of the electric rotating machine falls out of a permissible range, the controller may turn off the one of the switches immediately or after elapse of a given period of time.

The controller places the upper and lower arms in an off-state unless current, as generated in a corresponding one of the phase windings, is greater than a given value. In other words, when the generated current becomes greater than the given value, the controller starts switching the upper and lower arms, thereby ensuring the stability in the control of the electric rotating machine.

The controller may monitor the phase voltage. When the phase voltage has an unusual value, the controller may turn off a corresponding portion or all of the upper and lower arms.

The controller may monitor a sequence of one of the on-operations and the off-operations of the switches of the upper and lower arms. When the monitored sequence is an unusual sequence, the controller may turn off a corresponding portion or all of the upper and lower arms.

When the current flywheel duration is not provided, the controller may turn off the one of the switches earlier than time to be calculated based on the current flywheel duration.

According to the third aspect of the invention, there is provided a power converter for a multi-phase electric rotating machine which comprises a plurality of rectifier modules which work to convert ac current, as produced in the multi-phase electric rotating machine, into dc current. Each of the rectifier modules is provided for one of phase windings of the electric rotating machine and disposed between a power supply and the one of the phase windings. Each of the rectifier modules is equipped with switches functioning as an upper arm and a lower arm and a controller which controls on- and off-operations of each of the upper and lower arms. The controller controls the off-operation of one of the upper and lower arms to set a current flywheel duration, in which flywheel current that is current freewheeling from a corresponding one of the phase windings is permitted to flow and which is a time length between when a phase voltage induced at a target one of the phase windings which is associated with the one of the upper and lower arms targeted for the off-operation exceeds a first threshold value and when the phase voltage drops below a second threshold value, to a selected time length following the off-operation of the one of the upper and lower arms.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
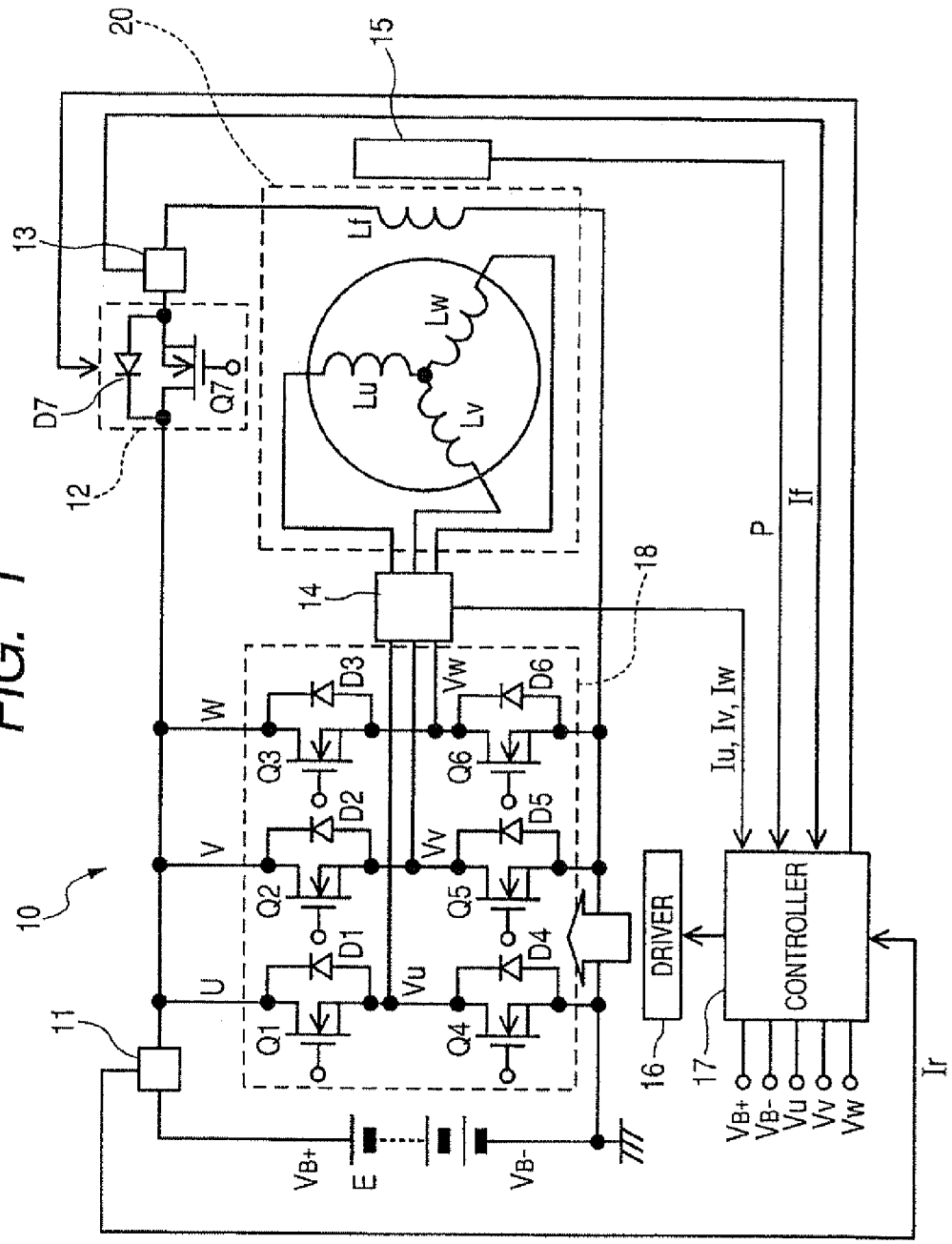
FIG. 1 is a circuit diagram of a power converter according to the invention.

Referring to the drawings, wherein like reference numbers refer to like parts in several views, particularly to FIG. 1, there is shown a power converter 10 according to the invention.

In the following discussion, "connection" means "electric connection unless otherwise specified. The logical values follow the positive logic. The high level (true, one (1), or on) is represented by "H", while the low level (false, zero (0) or off) is represented by "L".

The power converter 10 is designed to control an operation (i.e., rotation or stop) of an electric rotating machine 20 (also called a dynamo-electric machine) and equipped with a field controller 12, a driver 16, a controller 17, a switching circuit 18, and a power supply E. The power supply E, as referred to herein, is a dc power source.

The electric rotating machine 20 is implemented by, for example, a three-phase brushless DC motor that is a field winding synchronous machine. The electric rotating machine 20 includes a U-phase winding Lu, a V-phase winding Lv, and a W-phase winding Lw which are star-connected and a field winding Lf through which field current If flows.

The switching circuit 18 is a three-phase (i.e., U-phase, V-phase, and W-phase) inverter circuit and works in a motor-mode to convert the dc voltage, as supplied from the power supply E, into three-phase ac voltage to drive the electric rotating machine 20 and in a generator-mode to full wave-rectify the three-phase ac voltage, as supplied from the electric rotating machine 20. A basic operation of the power converter 10 (i.e., the switching circuit 18) is typical, and explanation thereof in detail will be omitted here. The switching circuit 18 is equipped with switches Q1, Q2, Q3, Q4, Q5, and Q6 and rectifying devices D1, D2, D3, D4, D5, and D6. The switches Q1 to Q6 may each be implemented by a MOSFET. The rectifying devices D1 to D6 may each be implemented by a diode. The switches Q1, Q3, and Q5 form an upper arm. The switches Q2, Q4, and Q6 form a lower arm. The switches Q1 and Q4 work for the U-phase. The switches Q2 and Q5 work for the V-phase. The switches Q3 and Q6 work for the W-phase. The rectifying device D1 is connected parallel to the switch Q1 and serves as a freewheeling diode through which the current freewheeling from the electric rotating machine 20 flows. Similarly, the rectifying devices D2 to D6 are connected in parallel to the switches Q2 to Q6, respectively, to function, like the rectifying diode D1.

The controller 17 receives instructions from an external controller (not shown) or outputs from various types of sensors (not shown) to produce in the motor mode control signals that are PWM (Pulse Width Modulation) signals for the switches Q1 to Q6 and in the generation mode control signals (i.e., PWM signals) for achieving synchronous rectification through the switches Q1 to Q6. The controller 17 is made of a CPU to perform logical programs, but however, may be implemented by a hardwired logic equipped with some circuit elements.

The driver 16 is responsive to the control signals from the controller 17 to produce and output drive signals to gates of the switches Q1 to Q6 of the switching circuit 18 to turn on or off the switches Q1 to Q6.

The field controller 12 is responsive to an output from the controller 17 to control the field current If flowing through the field winding Lf. The field controller 12 is made up of a switch Q7 and a rectifying device D7. The switch Q7 is, for example, a MOSFET. The rectifying device D7 is, for example, a diode.

The power converter 10 also includes current sensors 11, 13, and 14. The current sensor 11 measures the value of the flywheel current Ir flowing out of the electric rotating machine 20. The current sensor 13 measures the value of the field current If flowing through the field winding Lf. The current sensor 14 measures values of U-phase current Iu flowing through the U-phase winding, V-phase current Iv flowing through the V-phase winding, and W-phase current Iw flowing through the W-phase winding. The current sensors 11, 13, and 14 may be of a magnetic type equipped with a Hall device. The power converter 10 further includes a position sensor 15 which measures an angular position P of a rotary member such as a rotor assembled in the electric rotating machine 20. The position sensor 15 is made of a resolver which is either of a magnetic or optical type.

Figure 2:
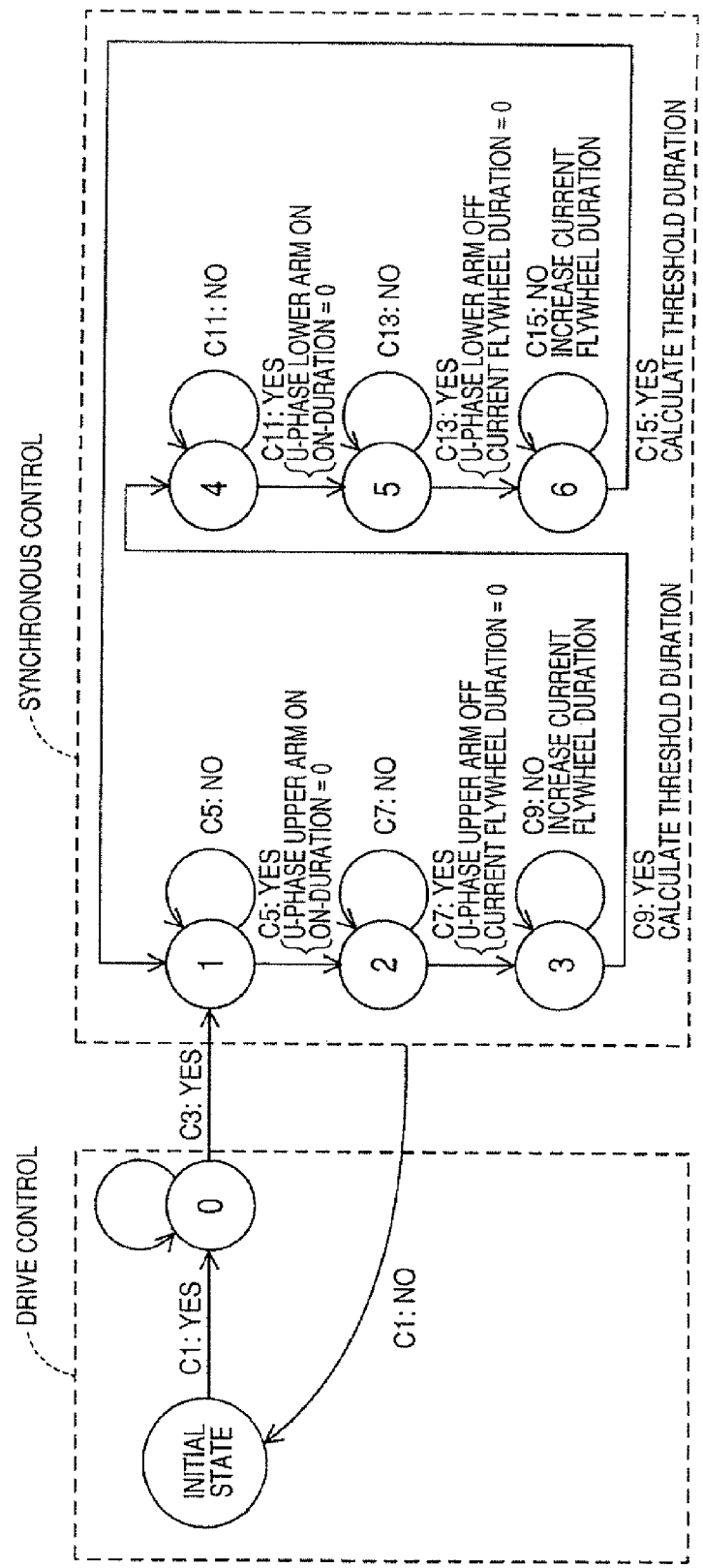
FIG. 2 is an illustration exemplifying a transient state of a control mode of the power converter of FIG. 1.
Figure 3:
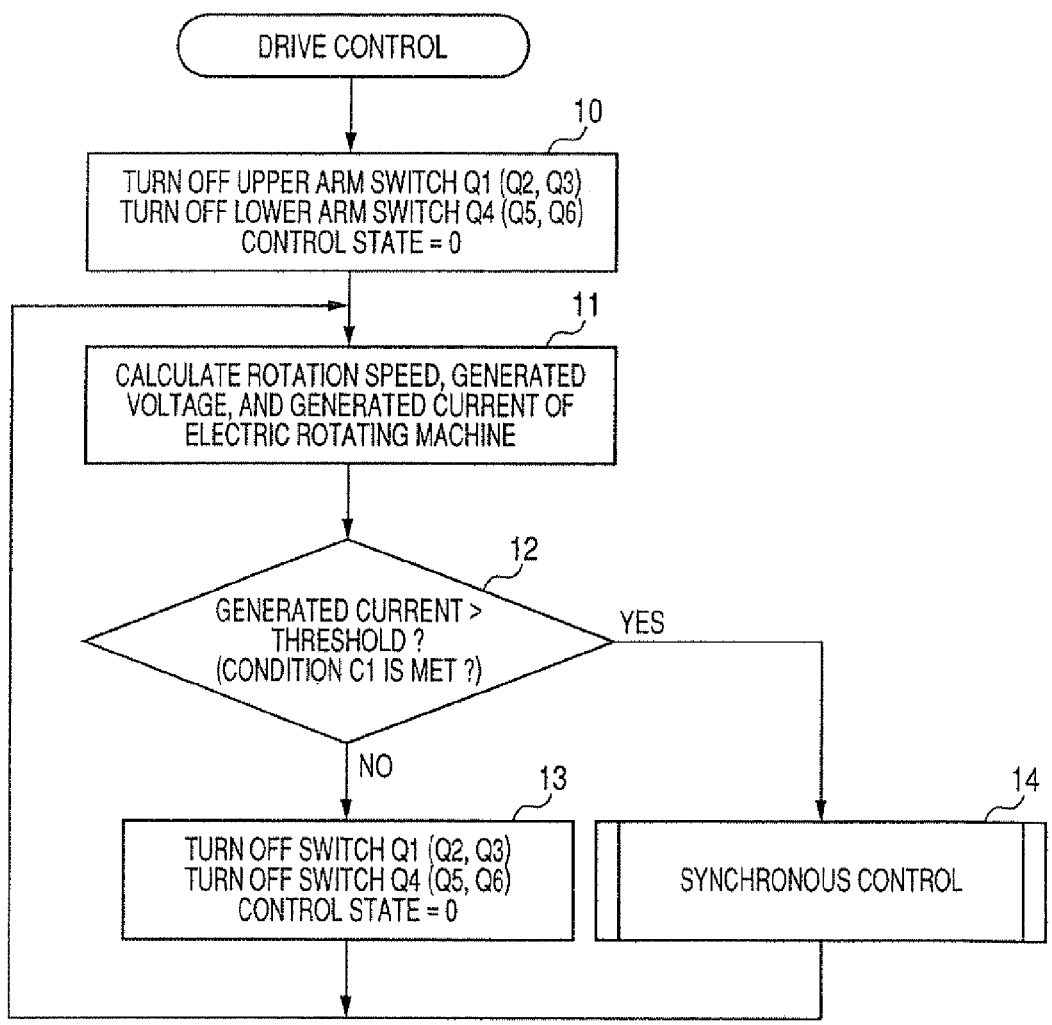
FIG. 3 is a flowchart of a drive control program to drive an inverter circuit of the power converter of FIG. 1.
Figure 4:
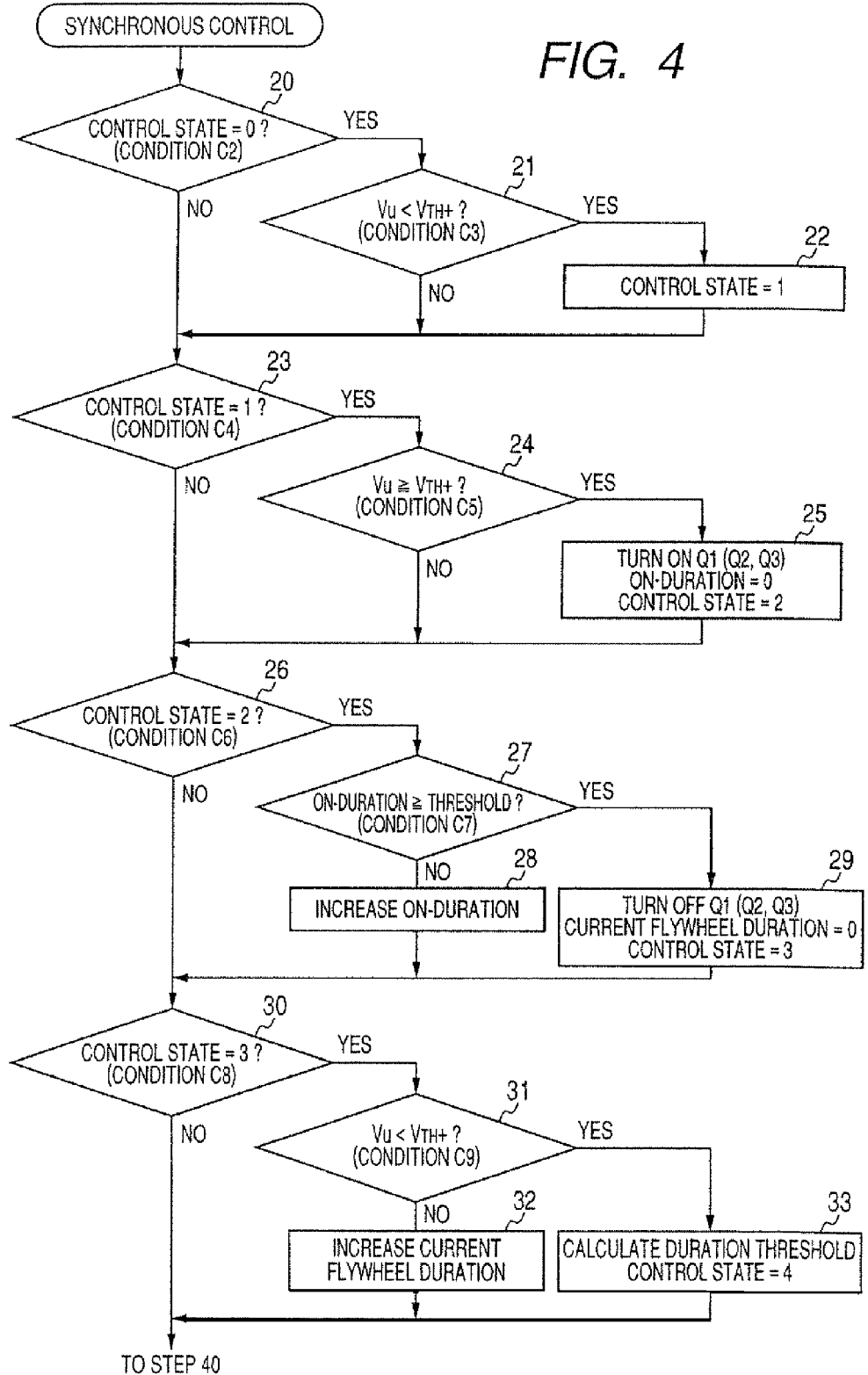
FIGS. 4 and 5 are a flowchart of a synchronous control program executed in the program of FIG. 3.
Figure 5:
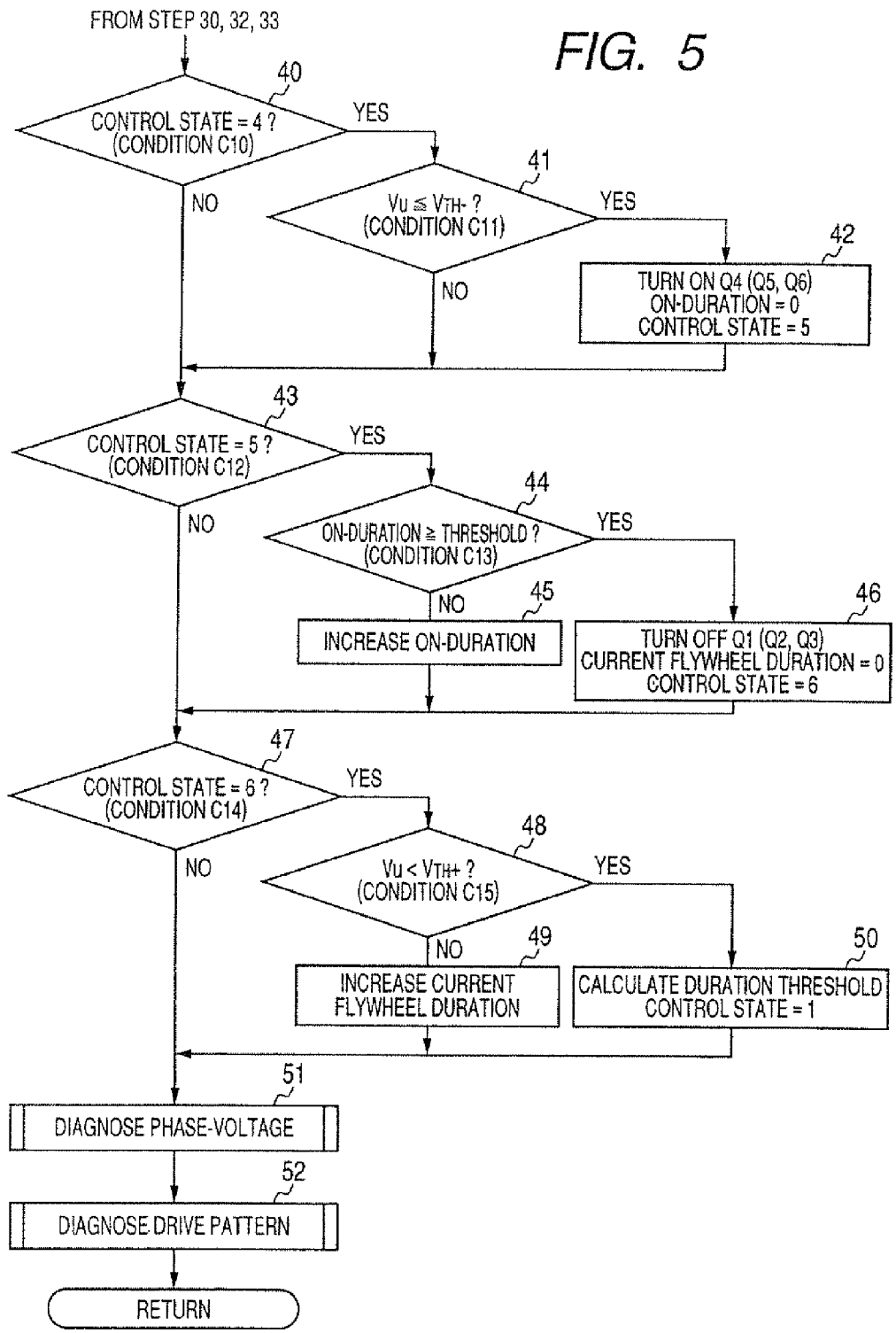
Figure 6:
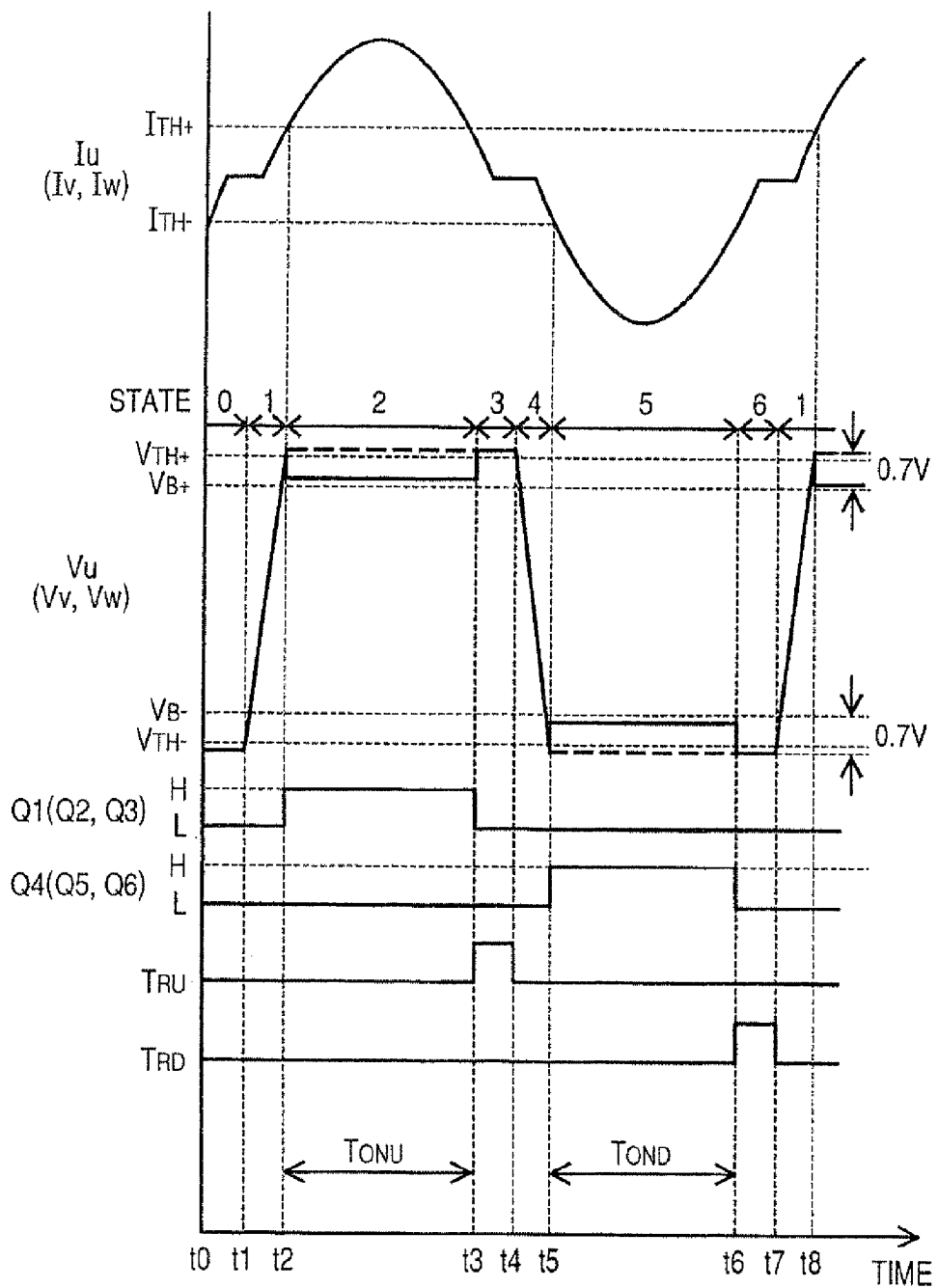
FIG. 6 is a time chart which demonstrates changes in phase voltage and state of arms of an inverter of the power converter of FIG. 1.
Figure 7A:
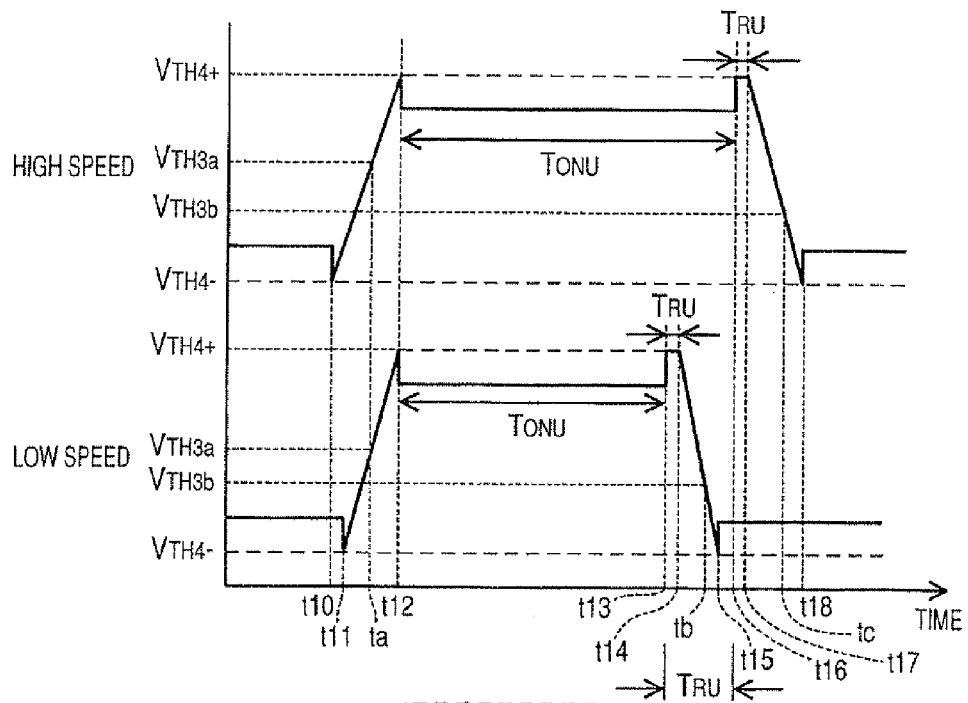
FIG. 7(a) is an illustration which demonstrates changes in phase voltage for different speeds of an electric rotating machine.
Figure 7B:
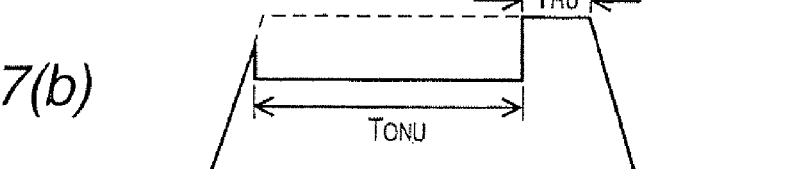
FIGS. 7(b) and 7(c) are illustrations which demonstrate how to change a current flywheel duration when the speed of an electric rotating machine is expected to be changed suddenly.
Figure 7C:
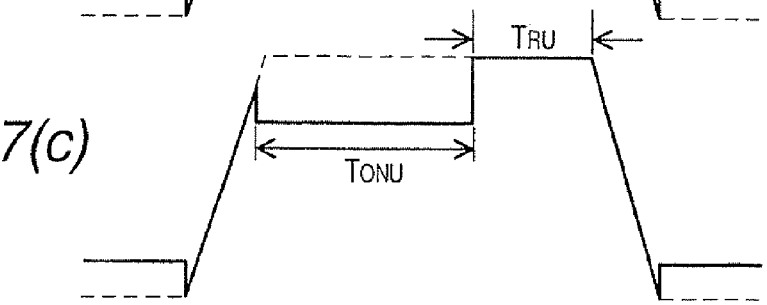
Figure 8:
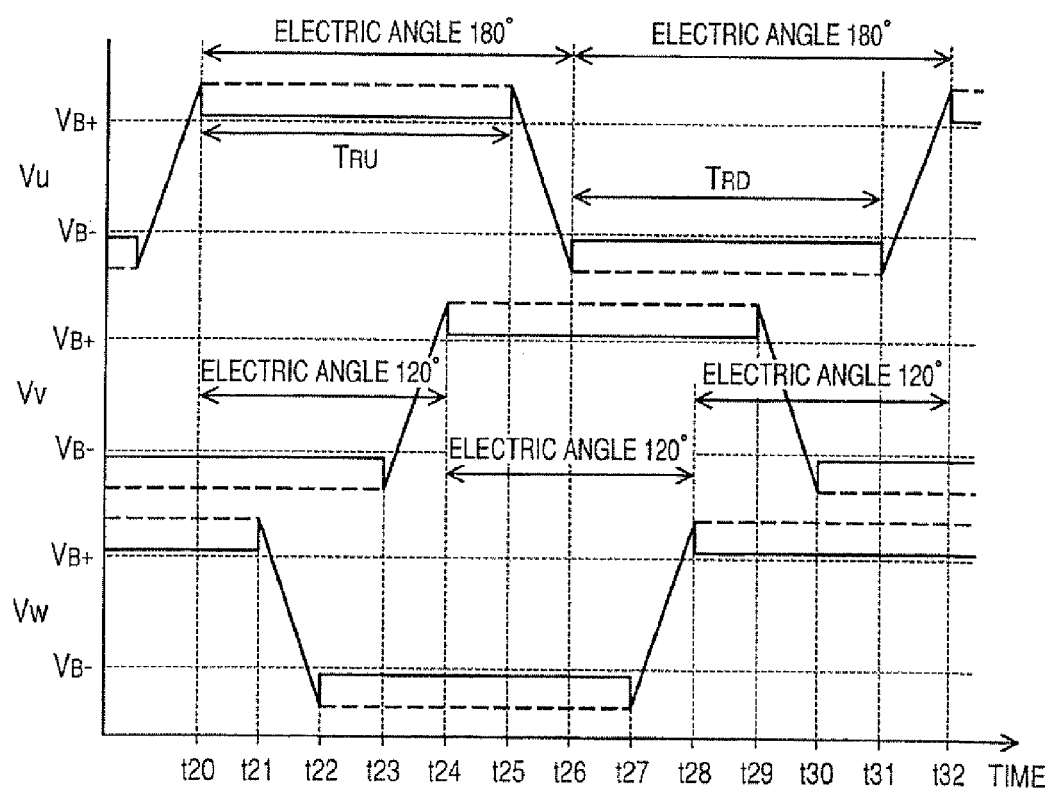
FIG. 8 is an illustration which exemplifies a pattern of changes in phase voltage in an electric rotating machine.

The operation of the power converter 10 to control a switching operation of the switching circuit 18 will be described below with reference to FIGS. 2 to 8. FIG. 2 demonstrates a transient state of the power converter 10. FIG. 3 is a flowchart of a drive control program. FIGS. 4 and 5 are a flowchart of a synchronous control program. FIG. 6 is a time chart which illustrates a change in phase voltage or state of the arms. FIG. 7(a) demonstrates a change in phase voltage for different speeds of the electric rotating machine 20. FIGS. 7(b) and 7(c) demonstrate changes in phase voltage when the speed of the electric rotating machine 20 is expected to be changed suddenly. FIG. 8 illustrates an example of a wave pattern of changes in phase voltage to diagnose the electric rotating machine 20 based on the three phase voltages. The three phases: the U-phase, the V-phase, and the W-phase are different only in electrical angle, and the following discussion will be made only on the U-phase for the sake of simplicity. Accordingly, the switch Q1 will also be referred to as the upper arm. The switch Q4 will also be referred to as the lower arm.

The controller 17 outputs the control signal to the switching circuit 18 based on the transient state, as illustrated in FIG. 2. In FIG. 2, encircles numbers represent sequential states of the power converter 10. In an initial state or the state 0, the power converter 10 is placed in the drive control mode, as illustrated in FIG. 3. In the states 1 to 6, the power converter 10 is placed in the synchronous control mode, as illustrated in FIGS. 4 and 5. The states, as demonstrated in FIG. 2, are the same for the U-, V-, and W-phases. The following discussion, as already described, will be made on the U-phase for convenience.

The following conditions are used in FIGS. 2 to 5.
C1: the U-phase current Iu is greater than an initial motion current value Is (Iu>Is);
C2: the control state is the state 0;
C3: the U-phase voltage Vu is lower than a threshold voltage $V_{TH+}$ (Vu<$V_{TH+}$);
C4: the control state is the state 1;
C5: the U-phase voltage Vu is greater than or equal to the threshold voltage Vs (Vu≧$V_{TH+}$);
C6: the control state is the state 2;
C7: an on-duration $T_{ONU}$ of the upper arm is greater than or equal to a threshold duration $T_{THU}$ ($T_{ONU}$≧$T_{THU}$);
C8: the control state is the state 3;
C9: the U-phase voltage Vu is lower than the threshold voltage $V_{TH+}$ (Vu<$V_{TH+}$);
C10: the control state is the state 4;
C11: the U-phase voltage Vu is lower than or equal to a threshold voltage $V_{TH-}$ (Vu<$V_{TH-}$);
C12: the control state is the state 5;
C13: an on-duration $T_{OND}$ of the lower arm is greater than or equal to a threshold duration $T_{THD}$ ($T_{OND}$≧$T_{THD}$);
C14: the control state is the state 6; and
C15: the U-phase voltage Vu is lower than the threshold voltage $V_{TH+}$ (Vu<$V_{TH+}$).

The initial state represents a state of the power converter 10 immediately after the power converter 10 is powered on or initialized when the electric rotating machine 20 experiences an unexpected change in operating condition thereof. The controller 17 turns off all the switches Q1 to Q6. The initial state continues unless the condition C1 is met. When the condition C1 is satisfied, the state 0 will be entered.

The state 0 is a state wherein the U-phase voltage Vu has started to be applied to the U-phase winding Lu of the electric rotating machine 20. The state 0 continues unless the condition C3 is met. When the condition C3 is satisfied, the state 0 will change to state 1.

The state 1 is a state wherein the U-phase voltage Vu is increasing, but does not yet reach the threshold voltage $V_{TH+}$. The state 1 continues unless the condition C5 is met. When the condition C5 is satisfied, the state 1 will change to the state 2.

The state 2 is a state wherein the U-phase voltage Vu has exceeded the threshold voltage $V_{TH+}$. The controller 17 turns on the upper arm, i.e., the switch Q1. The state 2 continues unless the condition C7 is met. When the condition C7 is satisfied, the state 2 will change to the state 3.

The state 3 is a state wherein the on-duration of the switch Q1 has exceeded the duration threshold $T_{THU}$. The controller 17 turns off the switch Q1. The state 3 continues unless the condition C9 is met. When the condition C9 is satisfied, the state 3 will change to state 4.

The state 4 is a state wherein the voltage is induced at the U-phase winding Lu of the electric rotating machine 20 due to turning off of the switch Q1, so that the current to freewheel to the switching circuit 18. The state 4 continues unless the condition C11 is met. When the condition C11 is satisfied, the state 4 will change to state 5.

The state 5 is a state wherein the voltage induced at the U-phase winding Lu of the electric rotating machine 20 has dropped below the threshold voltage $V_{TH-}$. The controller 17 turns on the lower arm, i.e., the switch Q4. The state 5 continues unless the condition C13 is met. When the condition C13 is satisfied, the state 5 will change to the state 6.

The state 6 is a state wherein the on-duration of the switch Q4 has exceeded the duration threshold $T_{THD}$. The controller 17 turns off the switch Q4. The state 6 continues unless the condition C15 is met. When the condition C15 is encountered, the state 6 will return to the state 1.

A sequence of steps achieving the transient state of FIG. 2 will be described below with reference to FIGS. 3 to 5. The programs of FIGS. 3 to 5 are executed for each of the three phases: the U-phase, the V-phase, and the W-phase. Only the U-phase will be referred to below for sake of simplicity.

After the drive control mode is entered, the program of FIG. 3 is initiated. The routine proceeds to step 10 wherein the controller 17 turns off the switch Q1 of the upper arm and the switch Q4 of the lower arm, and the control state is initialized to the state 0. The same, as described above, applies to the V-phase and the W-phase. Specifically, in step 10, all the switches Q1 to Q6 are placed in the off-state. When the switches Q1 to Q6 are all turned off, it will cause the rectification to be achieved only by the rectifying devices D1 to D6. The same applies to step 13, as described later.

After the control state is initialized, the routine proceeds to step 11 wherein the controller 17 monitors the operating condition of the electric rotating machine 20. Specifically, the controller 17 analyzes the output of the position sensor 15 to determine the angular position P and the speed of the electric rotating machine 20. Additionally, the controller 17 also analyzes the outputs of the current sensors 13 and 14 and determines the field current If and the U-phase current Lu (i.e., electric current generated in the U-phase winding Lu), respectively. Using the U-phase current Iu, the U-phase voltage Vu may be calculated based on the resistance value of the U-phase winding Lu.

The routine proceeds to step 12 wherein it is determined whether the U-phase current Iu, as derived in step 11, is greater than the initial motion current value Is or not, that is, the condition C1 is met or not. If a NO answer is obtained meaning that the U-phase current Iu is lower than or equal to the initial motion current value Is, the controller 17 concludes that the U-phase voltage Vu is not yet applied to the U-phase winding Lu of the electric rotating machine 10. The routine then proceeds to step 13 wherein the controller 17, like in step 10, keep the switches Q1 and Q4 off and places the control state in the state 0. The routine then returns back to step 11.

Alternatively, a YES answer is obtained in step 12 meaning that the U-phase current Iu is greater than the initial motion current value Is, the controller 17 concludes that the U-phase voltage Vu has started to be applied to the U-phase winding Lu of the electric rotating machine 20 and enters the synchronous control mode in step 14.

When step 14 is entered, the controller 17 starts executing the program of FIG. 4. A first check is made as to whether the conditions C2 and C3 are met or not. Specifically, in step 20, it is determined whether the control state 0 is met or not. If a YES answer is obtained, then the routine proceeds to step 21 wherein it is determined whether the U-phase voltage Vu is lower than the threshold voltage $V_{TH+}$ or not, that is, the condition C3 is met or not. If a YES answer is obtained, the controller 17 concludes that the U-phase voltage Vu is increasing, but does not yet reach the threshold voltage $V_{TH+}$. The routine then proceeds to step 22 wherein the control state is set to the state 1. Subsequently, a second check is made. Step 22 is for identifying the electrical angle and thus made under the condition that the control state has been the state 0. Consequently, step 22 is made only when the control state has been changed from the initial state wherein the power converter 20 is powered on or immediately after the electric rotating machine 20 is subjected to an unanticipated change. If a NO answer is obtained in step 20 meaning that the control state is not the state 0, or if a NO answer is obtained in step 21 meaning that the U-phase voltage Vu is greater than or equal to the threshold voltage $V_{TH+}$, the second check is made.

The second check is to determine whether the conditions C4 and C5 are met or not. Specifically, in step 23, it is determined whether the control state is the state 1 or not, that is, the condition C4 is met or not. If a YES answer is obtained, then the routine proceeds to step 24 wherein it is determined whether the U-phase voltage Vu is greater than or equal to the threshold voltage $V_{TH+}$ or not, that is, the condition C5 is met or not. If a YES answer is obtained, the controller 17 concludes that a given voltage is being applied to the U-phase winding Lu.

In step 24, it may alternatively be determined whether the phase current (e.g., the U-phase current h/u), as measured by the current sensor 14, is greater than or equal to the threshold current $I_{TH+}$ or not or smaller than or equal to the threshold current $I_{TH-}$ or not. When the electric rotating machine 20 is operating in the generator mode, in other words, functioning as the electric generator, it may be determined whether the current flowing to an external load is greater than or equal to the threshold current $I_{TH+}$ or smaller than or equal to the threshold current $I_{TH-}$. Alternatively, it may be determined whether the angular position P of the rotor of the electric rotating machine 20, as measured by the position sensor 15, is at a given angle (e.g., 5°) or not. The determination may be made whether some of the above conditions are simultaneously met or not. The threshold currents $I_{TH+}$ and the threshold current $I_{TH-}$ are preferably determined to have hysteresis values different from each other in order to avoid chattering. The reference current value is the value of the current Ir when increasing, but may be set to that when decreasing.

When the conditions C4 and C5 are met, the routine proceeds to step 25 wherein the controller 17 turns on the switch Q1 of the upper arm, initializes the on-duration $T_{ONU}$ indicating the length of time the switch Q1 is to be kept on to zero (0), and places the control state in the state 2. The routine then executes the third check. Alternatively, if a NO answer is obtained in step 23 meaning that the control state is not the state 1 or a NO answer is obtained in step 24 meaning that the U-phase current Vu is lower than the threshold voltage $V_{TH+}$, the routine executes the third check.

The third check is made to determine whether the conditions C6 and C7 are met or not. Specifically, it is determined in step 26 whether the control state is the state 2 or not, that is, the condition C6 is met or not. If a YES answer is obtained, then the routine proceeds to step 27 wherein it is determined whether the on-duration $T_{ONU}$ is greater than or equal to the threshold duration $T_{THU}$ or not. If a YES answer is obtained meaning that the time when the switch Q1 should be turned off has been reached, then the routine proceeds to step 29.

The determination in step 27 may alternatively be made as follows. It may be determined whether the phase current (e.g., the U-phase current Iu), as measured by the current sensor 14, has reached a given value or not. Alternatively, it may be determined whether the angular position P of the electric rotating machine 20 (i.e., the rotor), as measured by the position sensor 15, is at a given angle (e.g., 150°) or not. Alternatively, it may be determined whether a first delay time (e.g., several milliseconds) that is the time elapsed from the time when the arm of one of the three phases U, V, and W which is now targeted for the off operation made by the controller 17 (e.g., the switch Q1 or Q4 for the U-phase) or another phase (e.g., the V- or W-phase) was turned on has been reached or not. If the switch Q1 of the U-phase is a target to be turned off, the controller 17 determines whether the first delay time elapsed from when the switch Q1 or Q4 has been turned on or the switch Q6 of the lower arm for the W-phase that is now not a target to be turned off has been reached or not. Alternatively, it may be determined whether a second delay time (e.g., several milliseconds) that is the time elapsed from when the arm of a non-target phase that is now not a target to be turned off (e.g., the switch for the V- or W-phase) was turned off has been reached or not. If the switch Q1 of the U-phase is a target to be turned off, the controller 17 determines whether the second delay time elapsed from when the switch Q5 of the lower arm for the V-phase that is now not a target to be turned off was already turned off has been reached or not. One of the switches Q1 to Q6 or one of three phases U, V, and W which is a target to be now turned on or off by the controller 17 will also be referred to as a target switch or a target phase. Another of the switches Q1 to Q6 or another of the three phases U, V, W will also be referred to as a non-target switch or a non-target phase. It may alternatively be determined in step 27 whether the time that is selected as a function of either of the current flywheel duration $T_{RU}$ or $T_{RD}$ of the target phase has been elapsed or not. Alternatively, it may be determined whether at least one of the speed of the electric rotating machine 20, the phase current, and the phase voltage lies out of a permissible range or not. For example, it is determined whether a change in at least one of the speed of the electric rotating machine 20, the phase current, and the phase voltage per unit time has risen over an upper limit or dropped below a lower limit. If it has risen over the upper limit or dropped below the lower limit, the routine proceeds to step 29. Either or both of the lower and upper limits are preferably selected in terms of environmental conditions. If the current flywheel duration $T_{RU}$ is not provided, the controller 17 may determine that the condition C7 has been met before the on-duration $T_{ONU}$ exceeds the threshold duration $T_{THU}$, in other words, earlier than the time to be calculated based on the current flywheel duration $T_{RU}$. The routine then proceeds to step 29 to turn off the switch Q1. The determination may be made whether some of the above conditions are simultaneously met or not.

An example where the change in speed of the electric rotating machine 20 per unit time lies out of the permissible range will be described below with reference to FIG. 7(a). An upper curve indicates a change in U-phase voltage Vu when the speed of the electric rotating machine 20 is low. A lower cure indicates a change in U-phase voltage Vu when the speed of the electric rotating machine 20 is high. The upper and lower curves are so drawn as to coincide with each other in time t12 when the upper arm is to be turned on. When the upper arm is turned on at time t12, and the speed of the electric rotating machine 20 is lower, the turning off of the upper arm at time t15 will ensure the current flywheel duration $T_{RU}$. If the speed of the electric rotating machine 20 is subjected to a sudden change for some reason after the upper arm is turned on at time t12, turning off of the upper arm at time t15 without relation to the length of the on-duration $T_{ONU}$ may result in a difficulty in ensuring a required length of the current flywheel duration $T_{RU}$ even when the feedback control is performed.

In order to avoid the above problem, the controller 17 shortens the on-duration $T_{RU}$ as a function of a change in speed of the electric rotating machine 20 per unit time and turns off the upper arm at time t13 earlier than time t15. For instance, the rate of change in speed is greater than 10000 rpm/sec, a first and a second time length (which will be described later in detail) are multiplied by 1.5 to decrease the threshold duration $T_{THU}$, thereby resulting in a decrease in on-duration $T_{ONU}$ through step 27. This ensures the required length of the current flywheel duration $T_{RU}$. FIG. 7(a) demonstrates only for the case of the upper arm. The same applies to the lower arm.

The threshold voltage $V_{TH4+}$ when the upper arm is to be turned on at time t12, and the threshold voltage $V_{TH4-}$ when the lower arm is turned on at times t15 and t18 will also be referred to as a fourth threshold value. The threshold voltages $V_{TH3a}$ and $V_{TH3b}$ which will also be referred to as a third threshold value are set between the threshold voltages $V_{TH4+}$ and $V_{TH4-}$. In the example of FIG. 7(a), the threshold voltage $V_{TH3a}$ is determined to be greater than the threshold voltage $V_{TH3b}$, but the threshold voltage $V_{TH3a}$ may alternatively be determined to be smaller than or equal to the threshold voltage $V_{TH3b}$ ($V_{TH3a} \leq V_{TH3b}$). The threshold voltage $V_{TH3a}$ is used when the U-phase voltage Vu rises. The threshold voltage $V_{TH3b}$ is used when the U-phase voltage Vu drops. Specifically, in the example of FIG. 7(a), the U-phase voltage Vu reaches the threshold voltage $V_{TH3a}$ at time ta and also reaches the threshold voltage $V_{TH3b}$ at times tb and tc.

Referring back to FIG. 4, if a YES answer is obtained in step 27 meaning that the conditions C6 and C7 are met, then the routine proceeds to step 29 wherein the controller 17 turns off the switch Q1, initializes the current flywheel duration $T_{RU}$ of the switch Q1 to zero (0), and sets the control state to the state 3. The fourth check will be made subsequently. The switch Q1 may be turned off at the same time when the conditions C6 and C7 are met (i.e., without any time interval) or after the lapse of a given period of time (e.g., several milliseconds) from when the conditions C6 and C7 are met.

If a NO answer is obtained in step 26 meaning that the condition C6 is not yet met, that is, the control state is not the state 2, the fourth check will be made. Alternatively, if a NO answer is obtained in step 27 meaning that the control state is the state 2, but the on-duration $T_{ONU}$ is smaller than the threshold duration $T_{THU}$ ($T_{ONU} < T_{THU}$), then the routine proceeds to step 28 wherein the on-duration $T_{ONU}$ is increased. The routine then proceeds to the fourth check.

The fourth check is to determine whether the conditions C8 and C9 are met or not. Specifically, it is determined in step 30 whether the control state is the state 3 or not, that is, the condition C8 is met or not. If a YES answer is obtained, then the routine proceeds to step 31 wherein it is determined whether the U-phase voltage Vu is lower than the threshold voltage $V_{TH+}$ or not, that is, the condition C9 is met or not. If a YES answer is obtained, it means that the flywheel current Ir, as produced by the turning off of the switch Q1 in step 29, is flowing from the electric rotating machine 20 to the rectifying device D1. The routine then proceeds to step 33 wherein the controller 17 calculates the threshold duration $T_{THU}$, which will be used in the subsequent control cycle, and sets the control state to the state 4. The routine proceeds to the fifth check. The threshold duration $T_{THU}$ to be used in the subsequent control cycle is determined in step 33 according to the following equation (1).

$$\begin{aligned}&\text{Threshold duration } T_{THU} \text{ to be used in the subsequent}\\&\text{control cycle=Threshold duration } T_{THU} \text{ in this}\\&\text{control cycle+(first time length-current flywheel}\\&\text{duration } T_{RU})\end{aligned} \quad (1)$$

The first time length in Eq. (1) is determined as a desired or target value of the current flywheel duration $T_{RU}$ to be used in the subsequent control cycle. The current flywheel duration $T_{RU}$ may be determined as a function of at least one of the speed of the electric rotating machine 20, the phase current, and the phase voltage. The current flywheel duration $T_{RU}$ prepared for either of the upper or lower arm or any of the three phases may be used.

The operation of the controller 17 when the current flywheel duration $T_{RU}$ is set to a standard value, and the speed of the electric rotating machine 20 is subjected to a sudden change has been discussed with reference to FIG. 7(a). Another operation of the controller 17 when the speed of the electric rotating machine 20 is expected to change suddenly will be described below with reference to FIGS. 7(b) and 7(c).

In the example of FIG. 7(b), the current flywheel duration $T_{RU}$ is changed to be longer than the one in the example of FIG. 7(a). For example, the controller 17 may change or increase the current flywheel duration $T_{RU}$ at the time when a change in speed of the electric rotating machine 20 per unit time exceeds a first change threshold value or whenever the controller 17 desires. The longer the current flywheel duration $T_{RU}$, the shorter the threshold duration $T_{THR}$ to be calculated in Eq. (1) as being used in the subsequent control cycle. This causes the on-duration $T_{ONU}$ to be determined through step 27 to be shorter. Accordingly, even if the speed of the electric rotating machine 20 increases suddenly for some reason after the upper arm is turned on, a desired value of the current flywheel duration $T_{RU}$ is obtained. The same is true for the lower arm, and explanation thereof in detail will be omitted here.

In the example of FIG. 7(c), the first time length is set smaller than that in the example of FIG. 7(a). For example, the controller 17 may change or decrease the first time length when a change in speed of the electric rotating machine 20 per unit time exceeds a second change threshold value or whenever the controller 17 desires. The second change threshold value may be equal to or different from the first change threshold value. The smaller the first time length, the shorter the threshold duration $T_{THR}$ to be calculated in Eq. (1) for use in the subsequent control cycle as compared with FIG. 7(b). This causes the on-duration $T_{ONU}$ to be determined through step 27 to be shorter. Accordingly, even if the speed of the electric rotating machine 20 increases suddenly for some reason after the upper arm is turned on, a desired value of the current flywheel duration $T_{RU}$ will be obtained because the on-duration $T_{ONU}$ has been shortened. The same is true for the lower arm, and explanation thereof in detail will be omitted here.

Referring back to FIG. 4, if a NO answer is obtained in step 30 meaning that the control state is not the state 3, the fifth check will be made. Similarly, if a NO answer is obtained in step 31 meaning that the control state is the state 3, but the U-phase voltage Vu is greater than or equal to the threshold voltage $V_{TH+}$, then the routine proceeds to step 32 wherein the current flywheel duration $T_{RU}$ is increased. The routine then proceeds to the fifth check.

The fifth check is made in steps 40 and 41 in FIG. 5 to determine whether the conditions C10 and C11 are met or not.

In step 40, it is determined whether the control state 4 is met or not. If a YES answer is obtained, then the routine proceeds to step 41 wherein it is determined whether the U-phase voltage Vu is lower than or equal to the threshold voltage $V_{TH-}$ or not, that is, the condition C11 is met or not. If a YES answer is obtained, the controller 17 concludes that the flywheel current Ir flowing out of the electric rotating machine 20 has almost disappeared. The determination in step 41 may alternatively be made in another manner, as described above with reference to FIG. 4. In a sequence of steps in FIG. 5, the non-target arm indicates, for example, the switch Q1.

If a YES answer is obtained in step 41 meaning that the condition C11 is met, then the routine proceeds to step 42 wherein the controller 17 turns on the switch Q4 of the lower arm, initializes the on-duration $T_{ONU}$ indicating the length of time the switch Q4 is to be kept on to zero (0), and sets the control state to the state 5. The routine then executes the sixth check. Alternatively, if a NO answer is obtained in step 40 meaning that the control state is not the state 4 or a NO answer is obtained in step 41 meaning that the control state is the state 4, but the U-phase current Vu is greater than the threshold voltage $V_{TH-}$, the routine executes the sixth check.

The sixth check is made to determine whether the conditions C12 and C13 are met or not. Specifically, it is determined in step 43 whether the control state is the state 5 or not, that is, the condition C12 is met or not. If a YES answer is obtained, then the routine proceeds to step 44 wherein it is determined whether the on-duration $T_{ONU}$ is greater than or equal to the threshold duration $T_{THD}$ or not. If a YES answer is obtained meaning that the time when the switch Q4 should be turned off has been reached, then the routine proceeds to step 46. The determination in step 44 may alternatively be made in another manner as described in step 27 of FIG. 4. If the current flywheel duration $T_{RD}$ is not provided, the controller 17 may conclude that the condition C13 has been met before the on-duration $T_{OND}$ exceeds the threshold duration $T_{THD}$, in other words, earlier than the time to be calculated based on the current flywheel duration $T_{RD}$ and turn off the switch Q4 in the following step 46.

Specifically, if the conditions C12 and C13 have been met, the routine proceeds to step 46 wherein the controller 17 turns off the switch Q4, initializes the current flywheel duration $T_{RD}$ to zero (0), and sets the control state to the state 6. The routine then proceeds to the seventh check. The switch Q4 may be turned off at the same time when the conditions C12 and C13 are met (i.e., without any time interval) or after the lapse of a given period of time (e.g., several milliseconds) from when the conditions C12 and C13 are met.

If NO answer is obtained in step 43 meaning that the control state is not the state 5, that is, the condition C12 is not met, then the routine proceeds to the seventh check. Alternatively, if a NO answer is obtained in step 45 meaning that the control state is the state 5, but the on-duration $T_{OND}$ is smaller than the threshold duration $T_{THD}$ ($T_{OND}<T_{THD}$), then the routine proceeds to step 45 wherein the on-duration $T_{OND}$ is increased. The routine then proceeds to the fourth check.

The seventh check is to determine whether the conditions C14 and C15 are met or not. Specifically, it is determined in step 47 whether the control state is the state 6 or not, that is, the condition C14 is met or not. If a YES answer is obtained, then the routine proceeds to step 48 wherein it is determined whether the U-phase voltage Vu is lower than the threshold voltage $V_{TH+}$ or not, that is, the condition C15 is met or not. If a YES answer is obtained, it means that the flywheel current as produced by the turning off of the switch Q4 in step 46, is flowing from the electric rotating machine 20 to the rectifying device D4. The routine then proceeds to step 50 wherein the controller 17 determines the threshold duration $T_{THD}$, which will be used in the subsequent control cycle, and sets the control state to the state 1. The routine then proceeds to step 51 wherein the threshold duration $T_{THD}$ to be used in the subsequent control cycle is determined in step 50 according to the following equation (2).

Threshold duration $T_{THD}$ in the subsequent control cycle=Threshold duration $T_{THD}$ in this control cycle+(second time length−current flywheel duration $T_{RD}$) (2)

The second time length, as used in Eq. (2), is determined as a desired or target value of the current flywheel duration $T_{RD}$ to be used in the subsequent control cycle. The second time length may be selected to be equal to or different from the first time length, as described above. The current flywheel duration $T_{RD}$ may be determined as a function of at least one of the speed of the electric rotating machine 20, the phase current, and the phase voltage. The current flywheel duration $T_{RD}$ prepared for either of the upper or lower arm or any of the three phases U, V, and Q may be used.

If a NO answer is obtained in step 47 meaning that the control state is not the state 6, then the routine proceeds to step 51. Alternatively, if the control sate is the state 6, but the U-phase voltage Vu is greater than or equal to the threshold voltage $V_{TH+}$, that is, a NO answer is obtained in step 48, then the routine proceeds to step 49 wherein the current flywheel duration $T_{RD}$ is increased. The routine then proceeds to step 51.

In step 51, the controller 17 performs a phase voltage diagnosing function to diagnose the electric rotating machine 20 based on a combination of the phase voltages Vu, Vv, and Vw. The routine then proceeds to step 52 wherein the controller 17 performs a phase voltage diagnosing function to diagnose the electric rotating machine 20 based on a driven pattern in which the switches Q1 to Q6 are driven or energized. The diagnosing operations in steps 51 and 52 will be described later in detail with reference to FIG. 8. After step 52, the routine terminates the synchronous control task and then returns back to step 20 to start it again. If it is determined in step 51 or 52 that the electric rotating machine 20 is malfunctioning, the controller 17 may start executing the drive control program of FIG. 3 or alternatively turn off a corresponding portion of one of the upper and lower arms which is malfunctioning. For example, if the U-phase is malfunctioning, the controller 17 may turn off the switches Q1 and Q4.

An example of the sequence of steps in FIGS. 3 to 5 will be discussed below with reference to FIG. 6. In FIG. 6, the abscissa axis indicates the time. The uppermost curve indicates a controlled change in U-phase current Iu. The second curve indicates a controlled change in V-phase voltage Vu. The third and fourth curves indicate on-off operations of the switches Q1 and Q4. The fifth curve indicates the current flywheel duration $T_{RU}$. The sixth curve indicates the current flywheel duration $T_{RD}$. It is assumed that the power converter 10 is initialized at time t0 when the power converter 10 is turned on or reset.

When the U-phase voltage Vu exceeds the threshold voltage $V_{TH−}$ at time 0, the control state of the power converter 10 (i.e., the switching circuit 18) is placed in the state 1 (see step 22 in FIG. 4). Subsequently, when the U-phase voltage Vu exceeds the threshold voltage $V_{TH+}$ at time t2, the control state is placed in the state 2 (see step 25 of FIG. 4). At time t2 and time t8 which coincides with time t2 in the subsequent control cycle (i.e., the subsequent on-off cycle), the U-phase current Iu exceeds the threshold current $I_{TH+}$. The threshold current $I_{TH+}$ will also be referred to as a fifth threshold value.

When the state 2 is entered, the controller 17 turns on the switch Q1 of the upper arm, so that the U-phase voltage Vu will fall between the threshold voltage $V_{TH+}$ and the voltage $V_{B+}$ (at the plus terminal) of the power supply E. The on-duration $T_{ONU}$ continues to be increased as long as the switch Q1 is kept on (see step 28).

At time t3 when the on-duration $T_{ONU}$ exceeds the threshold duration $T_{THU}$, the switch Q1 is turned off, so that the control state is placed in the state 3 (see step 29 of FIG. 4). When the switch Q1 is turned off, so that the flywheel current Ir flows from the electric rotating machine 20, it will cause the U-phase voltage Vu to rise above the threshold voltage $T_{TH+}$. The threshold voltage $V_{TH+}$ used at time t3 will be referred to as a first threshold value. The current flywheel duration $T_{RU}$ continues to be increased as long as the U-phase voltage Vu is above the threshold voltage $V_{TH+}$ (see step 32). The current flywheel duration $T_{RU}$ continues until time t4 when the U-phase voltage Vu is decreased with a decrease in the flywheel current Ir below the threshold voltage $V_{TH+}$. The threshold voltage $V_{TH+}$ used at time t4 will be referred to as a second threshold value. In this embodiment, the first and second threshold values are determined to have the same value, but may alternatively be different from each other.

At time t4, the control state is place in the state 4. When the flow of the flywheel current Ir disappears, it will cause the U-phase voltage Vu to drop rapidly. When the U-phase voltage Vu drops below the threshold voltage $V_{TH−}$ at time t5, the control state is placed in state 5 (see step 42 of FIG. 5). At time t5, the U-phase current Iu is below the threshold current $I_{TH−}$. The threshold current $I_{TH−}$ is the fifth threshold value. In the state 5, the switch Q4 of the lower arm is turned on, so that the U-phase voltage Vu falls between the threshold voltage $V_{TH−}$ and the voltage $V_{B−}$ (at the minus terminal) of the power supply E. The on-duration $T_{OND}$ continues to be decreased as long as the switch Q4 is kept on (see step 45 of FIG. 5).

At time t6 when the on-duration $T_{OND}$ exceeds the threshold duration $T_{THD}$, the switch Q4 is turned off, so that the control state is placed in the state 6 (see step 46 of FIG. 5). When the switch Q4 is turned off, so that the flywheel current Ir flows from the electric rotating machine 20, it will cause the U-phase voltage Vu to drop below the threshold voltage $T_{TH−}$. The threshold voltage $V_{TH−}$ used at time t6 corresponds to the first threshold value. The current flywheel duration $T_{RD}$ continues to be increased as long as the U-phase voltage Vu is below the threshold voltage $V_{TH−}$ (see step 49). The current flywheel duration $T_{RD}$ continues until time t7 when the U-phase voltage Vu exceeds above the threshold voltage $V_{TH−}$. After time t7, the same operations as those between time t1 to time t7 are repeated. The threshold voltage $V_{TH−}$ used at time t7 corresponds to the second threshold value. The rising of the U-phase voltage Vu after time t7 is the same as that after time U. The threshold value $V_{TH−}$ also corresponds to the second threshold value.

The diagnosis made in step 51 of FIG. 5 will be described below in detail with reference to FIG. 8. In FIG. 8, the abscissa axis indicates the time. The uppermost curve indicates the U-phase voltage Vu. The second curve indicates the V-phase voltage Vu. The third curve indicates the W-phase voltage Vw.

The time when each of, for example, the switches Q1 and Q4 is to be turned on will be first described with reference to the U-phase voltage Vu. The interval between time t20 when the switch Q1 of the upper arm is to be turned on and time t26 when the switch Q4 of the lower arm is to be turned on is equivalent to an electric angle of 180°. Similarly, the interval between time t26 when the switch Q4 is to be turned on and time t32 when the switch Q1 is to be turned on is equivalent to an electric angle of 180°. In other words, the switch Q1 of the upper arm and the switch Q4 of the lower arm are turned on alternately at an interval of 180° in electrical angle. The same is true of the V-phase voltage Vu which is shifted by an electrical angle of 120° from the U-phase voltage Vu and the W-phase voltage Vw which is shifted by an electrical angle of 240° from the U-phase voltage Vu. The times when the switch Q1 of the upper arm and the switch Q4 of the lower arm are to be turned off alternately are also the same for the V- and W-phases.

The times when the switches Q1 to Q3 of the upper arm are to be turned on will be described below. The interval between time t20 when the switch Q1 for the U-phase is to be turned on and time t24 when the switch Q2 for the V-phase is to be turned on is equivalent to an electric angle of 120°. The interval between time t24 when the switch Q2 for the V-phase is to be turned on and time t28 when the switch Q3 for the W-phase is to be turned on is equivalent to an electric angle of 120°. Similarly, the interval between time t28 when the switch Q3 for the W-phase is to be turned on and time t32 when the switch Q1 for the U-phase is to be turned on is equivalent to an electric angle of 120°. Specifically, the switches Q1, Q2, and Q3 are turned on sequentially in that order in a cycle of 120° in electrical angle. The same is true of the switches Q4, Q5, and Q6 of the lower arms. The times when the switches Q4, Q5, and Q6 are to be turned off are also the same for the V- and W-phases.

When the electric rotating machine 20 is rotating properly, the above sequential on-off operations of the switches Q1 to Q6 will develop voltages, as listed in table 1 below. Table 1 represents the U-phase, V-phase, and W-phase voltages Vu, Vu, and Vw when the switches Q1 and Q4 for the U-phase are turned on or off. The same voltages are also obtained by the on-off operations of the switches Q2 and Q5 for the V-phase and the switches Q3 and Q6 for the W-phase.

TABLE 1

| Switch | Controlled | Time | Vu | Vv | Vw |
| --- | --- | --- | --- | --- | --- |
| Q1 | ON | t10 | $V_{B+}$ or more | $V_{B-}$ or less | $V_{B-}$ or more |
|  | OFF | t15 | $V_{B+}$ or more | $V_{B-}$ or more | $V_{B-}$ or less |
| Q4 | ON | t16 | $V_{B-}$ or less | $V_{B+}$ or more | $V_{B+}$ or less |
|  | OFF | t21 | $V_{B-}$ or less | $V_{B+}$ or less | $V_{B+}$ or more |

If at least one of the U-phase, V-phase, and W-phase voltages Vu, Vv, and Vw has a value different from that listed in Table 1, it means that the electric rotating machine 20 is in a transient state or subjected to an unexpected change, in other words, the level of voltage other than that in Table 1 is being applied to at least one of the switches Q1 to Q6. In such an event, the control state of the switching circuit 18 is placed in the initial state. Specifically, the controller 17 executes step 10 of FIG. 3 to turn off all the switches Q1 to Q6 and starts the drive control program and the synchronous control program over again. Alternatively, the controller 17 may turn off one of the switches Q1 to Q3 of the upper arm and one of the switches Q4 to Q6 of the lower arm which belong to one of the U-phase, the V-phase, and the W-phase which is in an abnormal voltage level and continue to perform the above operations.

The diagnosis made in step 52 of FIG. 5 will be described below in detail. When the electric rotating machine 20 is rotating properly, the controller 17 controls the on-operations of the switches Q1 to Q6 in a sequential order as shown below. The same applies to the off-operations of the switches Q1 to Q6.

the upper arm of the U-phase (i.e., the switch Q1)→the lower arm of the W-phase (i.e., the switch Q6)→the upper arm of the V-phase (i.e., the switch Q2)→the lower arm of the U-phase (i.e., the switch Q4)→the upper arm of the W-phase (i.e., the switch Q3)→the lower arm of the W-phase (i.e., the switch Q5)

If the on- or off-operations of the switches Q1 to Q6 have not been performed in the above sequential order, it means that the electric rotating machine 20 is in the transient state or subjected to an unexpected change. In such an event, the control state of the switching circuit 18 is placed in the initial state regardless of the diagnosis in step 51. Specifically, the controller 17 executes step 10 of FIG. 3 to turn off all the switches Q1 to Q6 and starts the drive control program and the synchronous control program over again. Alternatively, the controller 17 may turn off one of the switches Q1 to Q3 of the upper arm and one of the switches Q4 to Q6 of the lower arm which belong to one of the U-phase, the V-phase, and the W-phase which is out of the above sequential order and then continue to perform the above operations.

The power converter 10 of this embodiment has the following advantages.

The controller 17 works to control, as can be seen from FIGS. 4, 5, and 6, the off-operation of one of the upper and lower arms (e.g., the switch Q1, Q2, or Q3) so as to secure a desired length of time in which the flywheel current Iris permitted to flow from the electric rotating machine 20 (e.g., the current flywheel duration $T_{RU}$) between the time at which the U-phase voltage Vu exceeds the threshold voltage $T_{TH+}$ (i.e., the first threshold value) and the time at which the U-phase voltage Vu subsequently drops below the threshold voltage $T_{TH+}$ (i.e., the second threshold value). The same operation is made for the V-phase voltage Vu and the W-phase voltage Vw. The one of the upper and lower arms which is the target arm to be controlled in the off-operation corresponds to the switches Q1, Q2, and Q3 or the switches Q4, Q5, and Q6 depending upon the cyclic control timing. The controller 17 keeps the current flywheel durations $T_{RU}$ and $T_{RD}$ at the first and second time lengths, respectively, thereby ensuring the accuracy in setting the time when one of the arms (e.g., the switches Q4, Q5, and Q6) is to be controlled in a subsequent control cycle. This results in a decrease in loss of the rectification and avoids the backflow of current from the power supply E to the phase winding Lu, Lv, or Lw.

When the U-phase voltage Vu exceeds the threshold voltage $V_{TH3a}$ (i.e., the third threshold value) and then reaches the threshold voltage $V_{TH4+}$ (i.e., the fourth threshold value), the controller 17, as can be seen from steps 23 and 24 and FIG. 7, turns on the switch Q1 (i.e., the upper arm). Similarly, when the U-phase voltage Vu decreases below the threshold voltage $V_{TH3b}$ (i.e., the third threshold value) and then reaches the threshold voltage $V_{TH4-}$ (i.e., the fourth threshold value), the controller 17, as can be seen from steps 40 and 41 and FIG. 7, turns on the switch Q4 (i.e., the lower arm). The controller 17 controls the V-phase voltage Vu and the W-phase voltage Vw in the same manner as the U-phase voltage Vu. With the above arrangements, the controller 17 works to control the on-operations of the arms of the switching circuit 18 without use of the angular position P and the current, thus eliminating the need for sensors to measure the angular position P of and the current in the electric rotating machine 20. This results in a decrease in production cost of the power converter 10 as well as a decrease in loss of the rectification and also avoids the backflow of current from the power supply E to the phase winding Lu, Lv, or Lw.

When the U-phase current Iu reaches the fifth threshold value (i.e., the threshold current $I_{TH+}$ or $I_{TH-}$), the controller 17 turns on the switch Q1 or the switch Q4 (see steps 24 of FIG. 4 and step 41 of FIG. 5). The controller 17 also performs the same operation for the V-phase current Iv and the W-phase current Iw. If the controller 17 does not turn on the switches Q1 to Q6 in the above manner when any of the U-phase current Iu, the V-phase current Iv, and the W-phase current IW reaches the fifth threshold value, it results in an increase in loss of the rectification and the backflow of current from the power supply E to the phase windings Lu, Lv, and Lw. The above operation, however, alleviates these problems.

When the angular position P of the electric rotating machine 20 reaches a given position, the controller 17, as described above, may work to turn on the switch Q1 or the switch Q4 (see steps 24 of FIG. 4 and step 41 of FIG. 5). If the controller 17 does not turn on the switches Q1 to Q6 in the above manner when the angular position P has reached the given position, it results in increased possibility of an increase in loss of the rectification and the backflow of current from the power supply E to the phase windings Lu, Lv, and Lw. The above operation, however, alleviates these problems.

The controller 17 may be designed to turn off one of the upper and lower arms based on an input from the position sensor 15 (see step 27 of FIG. 4 and step 46 of FIG. 5). If an unexpected change (e.g., a sudden change in speed) occurs in the electric rotating machine 20, it may result in a failure in ensuring a desired length of the current flywheel duration $T_{RU}$ or $T_{RD}$. The controller 17, however, turns off one of the arms when the position of the electric rotating machine 20 reaches a given position, thereby ensuring the desired length of the current flywheel duration $T_{RU}$ or $T_{RD}$. This minimizes the loss of the rectification regardless of the operation of the electric rotating machine 20 and avoids the backflow of current from the power supply E to the phase winding Lu, Lv, or Lw.

The controller 17 may alternatively be designed to turn off one of the upper and lower arms based on an input from the current sensor 14 (see step 27 of FIG. 4 and step 46 of FIG. 5). If an unexpected change (e.g., a sudden change in speed) occurs in the electric rotating machine 20, it may result in a failure in ensuring a desired length of the current flywheel duration $T_{RU}$ or $T_{RD}$. The controller 17, however, turns off one of the arms when the phase current in the electric rotating machine 20 reaches a given value, thereby ensuring the desired length of the current flywheel duration $T_{RU}$ or $T_{RD}$. This minimizes the loss of the rectification regardless of the operation of the electric rotating machine 20 and avoids the backflow of current from the power supply E to the phase winding Lu, Lv, or Lw.

The controller 17 may be designed to turn off one of the upper and lower arms (i.e., the target arm) based on the first delay time that is the time elapsed from when one of the arms for the target phase or one of the arms for the non-target phase has been turned on (see step 27 of FIG. 4 and step 46 of FIG. 5). If an unexpected change (e.g., a sudden change in speed) occurs in the electric rotating machine 20, it may result in a failure in ensuring a desired length of the current flywheel duration $T_{RU}$ or $T_{RD}$. The controller 17, however, works to turn off one of the upper and lower arms after the elapse of a given period of time (i.e., the first delay time) following the turning on of one of the upper and lower arm for the target phase or the non-target phase, thereby ensuring the desired length of the current flywheel duration $T_{RU}$ or $T_{RD}$. For example, if the switch Q1 of the U-phase is targeted for the off-operation, the controller 17 turns off after the elapse of the first delay time from when the switch Q1 was turned on or the switch Q6 of the lower arm for the W-phase that is not targeted for the off-operation was turned on. This minimizes the loss of the rectification regardless of the operation of the electric rotating machine 20 and avoids the backflow of current from the power supply E to the phase winding Lu, Lv, or Lw.

The controller 17 may be designed to turn off one of the upper and lower arms based on the current flywheel duration $T_{RU}$ or $T_{RD}$, as provided for a target one (i.e., the target phase) of the U-, V-, and W-phases (see step 27 of FIG. 4 and step 46 of FIG. 5). Specifically, the controller 17 controls the operation of the arm for the target phase based on the current flywheel duration $T_{RU}$ or $T_{RD}$, as provided for the target phase regardless of the angular position P of or the current in the electric rotating machine 20. This eliminates the need for a sensor to measure the angular position P or the current in the electric rotating machine 20, thereby resulting in a decrease in production cost of the power converter 10 as well as a decrease in loss of the rectification and also avoiding the backflow of current from the power supply E to the phase winding Lu, Lv, or Lw.

The controller 17 may alternatively be designed to turn off one of the upper and lower arms based on the current flywheel duration $T_{RU}$ or $T_{RD}$, as provided for a non-target one (i.e., the non-target phase) of the U-, V-, and W-phases (see step 27 of FIG. 4 and step 46 of FIG. 5). Specifically, the controller 17 controls the operation of the arm for the target phase based on the current flywheel duration $T_{RU}$ or $T_{RD}$, as provided for the non-target phase regardless of the angular position P of or the current in the electric rotating machine 20. This eliminates the need for a sensor to measure the angular position P or the current in the electric rotating machine 20, thereby resulting in a decrease in production cost of the power converter 10 as well as a decrease in loss of the rectification and also avoiding the backflow of current from the power supply E to the phase winding Lu, Lv, or Lw. Further, even if the target phase is subjected to a cyclic electrical disturbance, the controller 17 controls the operation of the arm based on the non-target phase, thus minimizing an error in control operation and improving the response rate of the controller 17.

The controller 17 may alternatively be designed to turn off one of the upper and lower arms for a target one of the U-, V-, and W-phases based on the second delay time that is the time elapsed from when the arm of the non-target phase was turned off (see step 27 of FIG. 4 and step 46 of FIG. 5). Specifically, the controller 17 works to turn off one of the upper and lower arms for the target phase after the elapse of a given period of time (i.e., the second delay time) following the turning off of the arm for the non-target phase, thus eliminating the need for a sensor to measure the angular position P of or the current in the electric rotating machine 20. This results in a decrease in production cost of the power converter 10, minimizes the loss of the rectification regardless of the operation of the electric rotating machine 20, and avoids the backflow of current from the power supply E to the phase winding Lu, Lv, or Lw. Further, even if the target phase is subjected to a cyclic electrical disturbance, the controller 17 is operable to control the operation of the arm based on the non-target phase, thus minimizing an error in control operation and improving the response rate of the controller 17.

The controller 17 may be designed to determine the current flywheel duration $T_{RU}$ or $T_{RD}$ based on at least one of the speed, the phase current Lu, Lv, or Lw, or the phase voltage Vu, Vv, or Vw (see step 33 of FIG. 4 and step 50 of FIG. 5). Specifically, the controller 17 specifies or modifies the length of the current flywheel duration $T_{RU}$ or $T_{RD}$ regardless of the first and second threshold values. For example, the controller 17 may increase or decrease the current flywheel duration $T_{RU}$ or $T_{RD}$, as determined by the first and second threshold value. Alternatively, if the current flywheel duration $T_{RU}$ or $T_{RD}$, is not yet provided, the controller 17 newly determines a required length of the current flywheel duration $T_{RU}$ or $T_{RD}$ as a function of at least one of the speed, the phase current, or the phase voltage of the electric rotating machine 20. This ensures a desired length of a period of time in which the flywheel current Ir is permitted to flow from the electric rotating machine 20. This results in a decrease in loss of the rectification, avoids the backflow of current from the power supply E to the phase winding Lu, Lv, or Lw, and improves the reliability in operation of the power converter 10.

The controller 17 may be designed to turn off the arms of the switching circuit 18 at the same time as or a predetermined period of time after at least one of the speed of the electric rotating machine 20, the phase current Iu, Iv, or Iw, and the phase voltage Vu, Vv, or Vw falls out of a permissible range (see steps 27 and 29 of FIG. 4 and steps 44 and 46 of FIG. 5). Specifically, if an unexpected change (e.g., a sudden change in speed) occurs in the electric rotating machine 20, so that at least one of the speed of the electric rotating machine 20, the phase current Iu, Iv, or Iw, and the phase voltage Vu, Vv, or Vw falls out of the permissible range, the controller 17 turns off the arms, thereby ensuring a desired length of the current flywheel duration $T_{RU}$ or $T_{RD}$. This minimizes the loss of the rectification and avoids the backflow of current from the power supply E to the phase winding Lu, Lv, or Lw.

The controller 17 may be so designed that when the flywheel current Ir, as produced by turning off of one of the upper and lower arms, reaches the reference current value, the other of the upper and lower arms is turned on (see steps 24 and 25 of FIG. 4 and steps 41 and 42 of FIG. 5). This avoids an excessive flow of the flywheel current Ir to the one of the upper and lower arms, thereby ensuring the reliability in operation of the power converter 10.

The controller 17 monitors the phase voltages Vu, Vv, and Vw when each of the upper and lower arms of the switching circuit 18 is being controlled in the on-off operation If at least one of the phase voltages Vu, Vv, and Vw has an unusual level, the controller 17 disenables a corresponding portion of the arms or all of the arms (see step 51 and Table 1). Specifically, the controller 17 turns off the corresponding portion of or all the arms to place the control state in the initial state, thereby preventing the corresponding arm from falling out of control due to the application of the one of the phase voltages Vu, Vu, and Vw to corresponding ones of the switches Q1 to Q6.

The controller 17 works to diagnose a sequence of on-off operations of the arms in relation to the phases U, V, and W. If the diagnosed sequence is found to be different from a specified sequence, the controller 17 disenables, as described in step 52 of FIG. 5 and FIG. 8, a corresponding portion of or all the arms (i.e., the switches Q1 to Q6). Specifically, in the above event, the controller 17 concludes that the electric rotating machine 20 is malfunctioning and turns off the corresponding portion of or all the arms to place the control state in the initial state, thereby preventing the corresponding arm from falling out of control due to the change in sequence of the on-off operations of the arms, which ensures the reliability in operation of the power converter 10.

When the current flywheel duration $T_{RU}$ or $T_{RD}$ is not provided, the controller 17 turns off the arm earlier than the time which is to be calculated based on the current flywheel duration $T_{RU}$ or $T_{RD}$ (see steps 29 of FIG. 4 and step 46 of FIG. 5). For example, the controller 17 shortens the threshold durations $T_{THU}$ or $T_{THD}$ which is specified in Eq. (1) or (2) as being used in a subsequent control cycle, so that the switches Q1 and Q4 will be turned off before the start (i.e., time t3 or time t6 in FIG. 6) of the current flywheel duration $T_{RU}$ or $T_{RD}$. This ensures a period of time in which the flywheel current Ir is permitted to flow out of the electric rotating machine 20 and which is longer than the current flywheel duration $T_{RU}$ or $T_{RD}$, thereby minimizing the loss of the rectification and avoiding the backflow of current from the power supply E to the phase winding Lu, Lv, or Lw, which will lead to improved reliability in operation of the power converter 10.

When the current, as generated in each of the phase windings Lu, Lu, and Lw, is greater than a given value, the controller 17 works to perform the switching operation to turn on corresponding ones of the switches Q1 to Q6. In other words, when each of the phase currents Iu, Iv, and Iw is not great enough to ensure the stability in the control of the electric rotating machine 20 (see step 13 of FIG. 3), the controller 17 keeps the corresponding ones of the switches Q1 to Q6 in the off-state. The controller 17 may be designed to monitor each of the phase voltages Vu, Vu, and Vw during the switching operations of the switches Q1 to Q6 and, when any one of the phase voltages Vu, Vu, and Vw is smaller than a given value, keep corresponding ones of the switches Q1 to Q6 turned off to avoid the instability in control of the electric rotating machine 20. Instead of the phase voltages Vu, Vv, and Vw, the controller 17 monitor the phase currents Iu, Iv, and Iw.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The controller 17 of the above embodiment measures the phase currents Iu, Iv, and Iw using the output from the current sensor 14 (see step 11 of FIG. 3), but may be designed to calculate the phase currents Iu, Iv, and Iw based on another parameter such as the angular position P or the speed of the electric rotating machine 20 or the field current If. In this case, it is advisable that, for example, the phase current Iu to be rectified by the rectifying device D1 and D4 be so shaped as to be trapezoidal in waveform thereof. When the calculated phase currents Iu, Iv, and Iw exceeds the initial motion current value Is, the controller 17 may find the fact that the phase currents Iu, Iv, and Iw have started to be applied to the phase windings Lu, Lv, and Lw of the electric rotating machine 20, thus obtaining the same operations and effects as those described in the above embodiment.

The condition C3 requires the U-phase voltage Vu to drops below the threshold voltage $V_{TH+}$ in order to know the electrical angle (see step 21 of FIG. 4), but however, another condition may be checked in step 21. For example, it may be determined whether phase current (e.g., the U-phase current Iu), as measured through the current sensor 14, has reached a given current value or not. It may also be determined whether the angular position P of the electric rotating machine 20, as measured through the position sensor 15, has reached a given angular position or not. Either or both of these conditions may be used.

The field controller 12 of the above embodiment consists of the switch Q7 and the rectifying device D7, but however, may alternatively be made by a regulator circuit of the alternator. This structure is also operable to control the field current If, thus obtaining the same operation and effects as those in the above embodiment.

Each of the current sensors 11, 13, and 14 is of a magnetic type equipped with a Hall device, but may alternatively be made by another type of current sensor. For example, an electromagnetic induction type sensor or a Faraday effect sensor may be used. In case of use of the electromagnetic induction type sensor, an annular core and a coil are disposed around a current bus bar to measure an induced electromotive force as produced by flow of the phase current. In case of use of the Faraday effect sensor, a rotation angle of the azimuth of a polarized wave which is to be rotated in proportion to the strength of a magnetic field when linearly polarized light enters an optical fiber disposed in a direction of the field is measured to determine the strength of the field (i.e., the current).

The position sensor 15 is, as described above, made of a resolver, but however, may be implemented by another type of sensor to measure the position of the rotor of the electric rotating machine 20. For instance, a rotary encoder (i.e., a photoelectric detector) or a coil may be used. The rotary encoder consists of a rotary disc with slits, a light source, and a photo detector. The photo detector is responsive to an input of light which is emitted by the light source to output an analog or digital signal to the controller 17. The coil produces an electromotive force when a magnetic salient pole passes near the coil and outputs the electromotive force in the form of an analog or digital signal to the controller 17.

The switching circuit 18 is equipped with a three-phase inverter circuit matching the number of phases of the electric rotating machine 20, but may include an inverter circuit with upper and lower arms for a single phase, two phases, or four or more phases. Specifically, the inverter circuit is used which has as many phases as the electric rotating machine 20.

Figure 9:
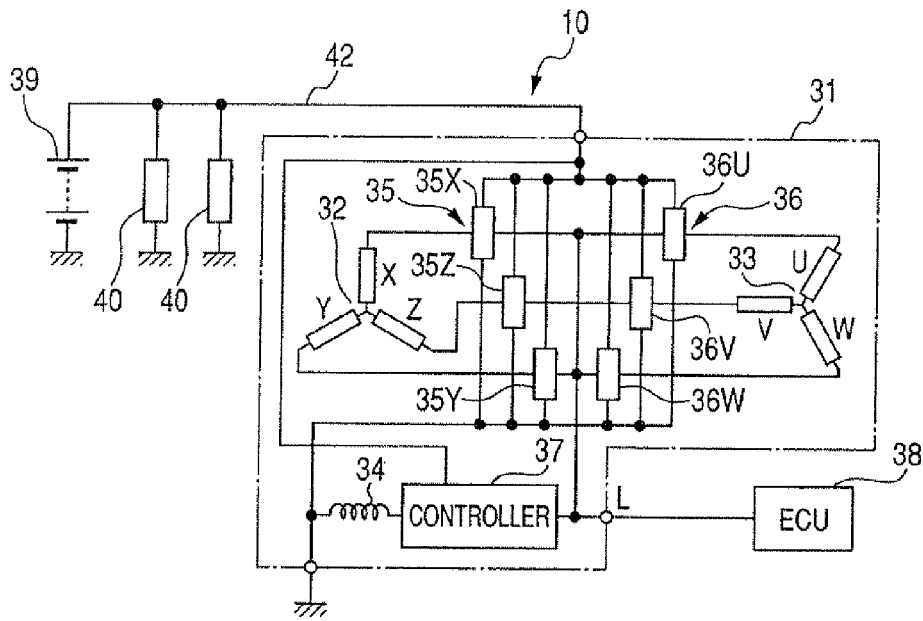
FIG. 9 is a block diagram which shows a power converter according to the second embodiment of the invention.

FIG. 9 illustrates the second embodiment of the power converter 10 designed to control the operation of an electric generator 31 for use in automotive vehicles. The generator 31 serves as an electric rotating machine and includes two stator windings 32 and 33, a field winding 34, two rectifier module groups 35 and 36, and a generation controller 37. Each of the rectifier module groups 35 and 36 works as a switching circuit for one of the stator windings 32 and 33. The generation controller 37 and the rectifier module groups 35 and 36 may alternatively be disposed outside the generator 31.

The stator winding 32 is a multi-phase winding made up of, for example, an X-phase winding, a Y-phase winding, and a Z-phase winding and wound around a stator core (not shown). Similarly, the stator winding 33 is a multi-phase winding made up of, for example, a U-phase winding, a V-phase winding, and a W-phase winding and wound around the stator core at an interval of 30° in electric angle away from the stator winding 32. The stator windings 32 and 34, and the stator core constitute the stator of the generator 31.

The field winding 34 is wound around a field pole (not shown) disposed to face the inner periphery of the stator core and forms a rotor of the generator 31. When a field current flows through the field winding 34, it will cause the field pole to be magnetized, thereby producing a revolving magnetic field, so that the ac voltage is developed at the stator windings 32 and 33.

The rectifier module group 34 is connected electrically to the stator winding 32 to form a three-phase full-wave rectifying circuit (bridge circuit) as a whole and works to convert the ac current, as induced in the stator winding 32, into the dc current. The rectifier module group 34 is made up of as many rectifier modules as the phases of the stator winding 32. In this embodiment, the rectifier module group 34 is made up of rectifier modules 35X, 35Y, and 35Z. The rectifier module 35X is connected to the X-phase winding of the stator winding 32. The rectifier module 35Y is connected to the Y-phase winding of the stator winding 32. Similarly, the rectifier module 35Z is connected to the Z-phase winding of the stator winding 32.

The rectifier module group 36 is connected electrically to the stator winding 33 to form a three-phase full-wave rectifying circuit (bridge circuit) as a whole and works to convert the ac current, as induced in the stator winding 33, into the dc current. The rectifier module group 36 is made up of as many rectifier modules as the phases of the stator winding 33. In this embodiment, the rectifier module group 36 is made up of rectifier modules 36U, 36V, and 36W. The rectifier module 36U is connected to the U-phase winding of the stator winding 33. The rectifier module 36V is connected to the V-phase winding of the stator winding 33. Similarly, the rectifier module 36 W is connected to the W-phase winding of the stator winding 33.

The generation controller 37 serves as an excitation current control circuit to control an excitation current (also called magnetizing current) flowing through the field winding 34 to regulate the voltage generated by the generator 31 (i.e., an output voltage of each of the rectifier modules 35X, 35Y, and 35Z and the rectifier modules 36U, 36V, and 36W. The generation controller 37 is also coupled through communication terminals and communication lines with an electronic control unit (ECU) 38 that is an external controller to establish a bidirectional serial communication (e.g., the so-called LIN (Local Interconnect Network) communication using the LIN protocol) between itself and the ECU 38 to transmit or receive messages to or from the ECU 38.

Figure 10:
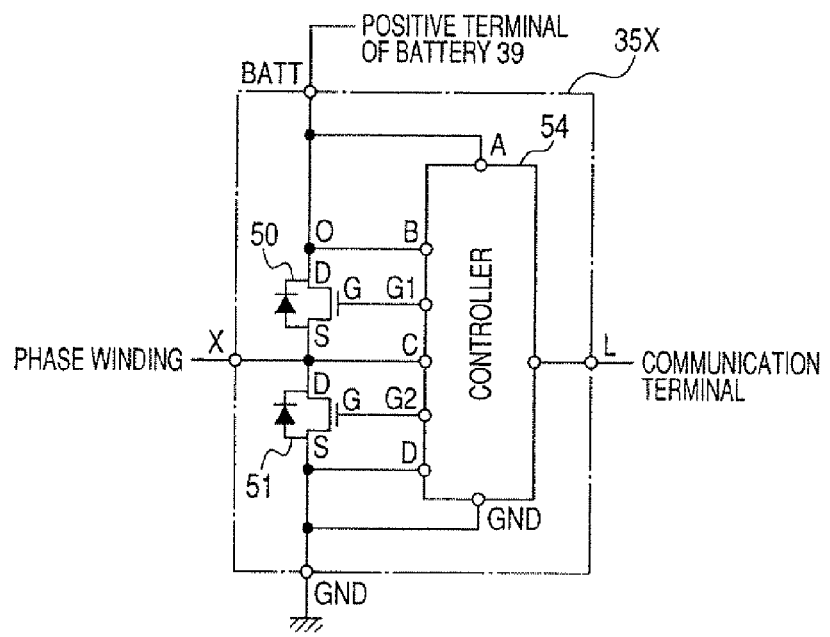
FIG. 10 is a circuit diagram which shows an internal structure of a rectifier module installed in the power converter of FIG. 9.

FIG. 10 illustrates an internal structure of the rectifier module 35X. The other rectifier modules 35Y, 35Z, 36U, 36V, and 36W have the same structure, and explanation thereof in detail will be omitted here.

The rectifier module 35X consists of two MOS transistors 50 and 51 and a control circuit 54. The MOS transistor 50 works as a switch of the upper arm (i.e., a high side arm) which is joined at a source thereof to the X-phase winding of the stator winding 32 and at a drain thereof to a positive terminal of a storage battery 39 and electric loads 40 through a charging line 42. The MOS transistor 51 works as a switch of the lower arm (i.e., a low side arm) which is joined at a drain thereof to the X-phase winding of the stator winding 32 and at a source thereof to a negative terminal (i.e., the earth) of the storage battery 39. Each of the MOS transistors 50 and 51 is, as clearly illustrated in FIG. 10, equipped with a diode disposed in parallel between the source and the drain thereof. The diode connected in parallel to the MOS transistors 51 and 51 is implemented by a parasitic diode (i.e., a body diode) thereof, but may alternatively be a separate diode. At least one of the MOS transistors 50 and 51 may be replaced with another type of switching device.

The MOS transistors 50 and 51 of the rectifier module 35X form the upper and lower arms, respectively. The other rectifier modules 35Y, 35Z, 36U, 36V, and 36W, as described above, have the same structure as the rectifier module 35X. Specifically, the rectifier module 35Y has the MOS transistors 50 and 51 forming the upper and lower arms of the Y-phase winding. The rectifier module 35Z has the MOS transistors 50 and 51 forming the upper and lower arms of the Z-phase winding. The rectifier module 36U has the MOS transistors 50 and 51 forming the upper and lower arms of the U-phase winding. The rectifier module 36V has the MOS transistors 50 and 51 forming the upper and lower arms of the V-phase winding. The rectifier module 36W has the MOS transistors 50 and 51 forming the upper and lower arms of the W-phase winding. The same upper and lower arms are used for each of the X-, Y-, Z-, U-, V-, and W-phases windings, thus facilitating ease of manufacturing power converters having different number of phase windings.

As apparent from the above discussion, each of the rectifier modules 35X, 35Y, 35Z, 36U, 3617, and 36W is designed to perform functions of a portion of the switching circuit 18, the driver 16, and the controller 17, as illustrated in FIG. 1. In other words, the control circuit 54 works to monitor the phase voltage developed at a corresponding one of the X-, Y-, Z-, U-, V-, and W-phases windings and control the off-operation of each of the upper and lower arms (i.e., the MOS transistors 50 and 51) so as to secure a desired length of time in which the flywheel current Ir is permitted to flow in the same manner, as described in the first embodiment. The phase voltage may be derived in the control circuit 54 by measuring the drain voltage, as developed at either of the MOS transistors 50 and 51.

What is claimed is:

1. A power converter for an electric rotating machine comprising:
    a switching circuit disposed between a power supply and a phase winding of an electric rotating machine, said switching circuit being equipped with switches grouped into an upper arm and a lower arm; and
    a controller which controls on- and off-operations of the upper and lower arms, said controller controlling the off-operation of one of the upper and lower arms to set a current flywheel duration, in which flywheel current that is current freewheeling from the electric rotating machine is permitted to flow from the electric rotating machine and which is a time length between when phase voltage induced at the phase winding exceeds a first threshold value and when the phase voltage drops below a second threshold value, to a selected time length following the off-operation of the one of the upper and lower arms, wherein
    said controller turns off the one of the upper and lower arms based on the current flywheel duration.

2. A power converter as set forth in claim 1, wherein when the phase voltage reaches a third threshold value and then reaches a fourth threshold value, said controller turns on the one of the upper and lower arms.

3. A power converter as set forth in claim 1, wherein when phase current reaches a fifth threshold value, said controller turns on the one of the upper and lower arms.

4. A power converter as set forth in claim 1, wherein when an angular position of the electric rotating machine reaches a given position, said controller turns on the one of the upper and lower arms.

5. A power converter as set forth in claim 2, further comprising a position sensor which works to measure an angular position of the electric rotating machine and output a signal indicative thereof, and wherein said controller turns off the one of the upper and lower arms based on an output from the position sensor.

6. A power converter as set forth in claim 2, further comprising a current sensor which works to measure a phase current produced in the phase winding and output a signal indicative thereof, and wherein said controller turns off the one of the upper and lower arms based on an output from the current sensor.

7. A power converter as set forth in claim 1, wherein said controller determines a length of the current flywheel duration based on at least one of a speed, a phase current, or the phase voltage of the electric rotating machine.

8. A power converter as set forth in claim 1, wherein when at least one of a speed, a phase current, or the phase voltage of the electric rotating machine falls out of a permissible range, said controller turns off the one of the upper and lower arms immediately or after elapse of a given period of time.

9. A power converter as set forth in claim 1, wherein said controller places the upper and lower arms in an off-state unless current, as generated in the phase winding, is greater than a given value.

10. A power converter as set forth in claim 1, wherein said controller monitors the phase voltage, when the phase voltage has an unusual value, said controller turning off a corresponding portion or all of the upper and lower arms.

11. A power converter as set forth in claim 1, wherein said controller monitors a sequence of one of the on-operations and the off-operations of the switches of the upper and lower arms, when the monitored sequence is an unusual sequence, said controller turning off a corresponding portion or all of the upper and lower arms.

12. A power converter as set forth in claim 1, wherein when the current flywheel duration is not provided, said controller turns off the one of the upper and lower arms earlier than time to be calculated based on the current flywheel duration.

13. A power converter for a multi-phase electric rotating machine comprising:
    a switching circuit disposed between a power supply and phase windings of an electric rotating machine, said switching circuit being equipped with switches grouped into an upper arm and a lower arm for each of the phase windings; and
    a controller which controls on- and off-operations of each of the switches of the upper and lower arms, said controller controlling the off-operation of one of the switches of one of the upper and lower arms to set a current flywheel duration, in which flywheel current that is current freewheeling from the electric rotating machine is permitted to flow from the electric rotating machine and which is a time length between when a phase voltage induced at a target one of the phase windings which is associated with the one of the switches targeted for the off-operation exceeds a first threshold value and when the phase voltage drops below a second threshold value, to a selected time length following the off-operation of the one of the switches, when the phase voltage reaches a third threshold value and then reaches a fourth threshold value, said controller turning on the one of the switches.

14. A power converter as set forth in claim 13, wherein said controller turns off the one of the switches based on a first delay time from when a target switch that is one of the switches of one of phases which is targeted for the off-operation or a non-target switch that is one of the switches of another of the phases which is non-targeted for the off-operation has been turned on.

15. A power converter as set forth in claim 13, wherein said controller turns off the one of the switches based on the current flywheel duration set for one of the phases associated with the one of the switches.

16. A power converter as set forth in claim 13, wherein said controller turns off the one of the switches based on the current flywheel duration set for a non-target switch that is one of the switches which is non-targeted for the off-operation.

17. A power converter as set forth in claim 13, wherein said controller turns off the one of the switches after elapse of a second delay time from when a non-target switch that is one of the switches which is now non-targeted for the off-operation was turned off.

18. A power converter as set forth in claim 13, wherein said controller determines a length of the current flywheel duration based on at least one of a speed, a phase current, or the phase voltage of the electric rotating machine.

19. A power converter as set forth in claim 13, wherein when at least one of a speed, a phase current, or the phase voltage of the electric rotating machine falls out of a permissible range, said controller turns off the one of the switches immediately or after elapse of a given period of time.

20. A power converter as set forth in claim 13, wherein said controller places the upper and lower arms in an off-state unless current, as generated in a corresponding one of the phase windings, is greater than a given value.

21. A power converter as set forth in claim 13, wherein said controller monitors the phase voltage, when the phase voltage has an unusual value, said controller turning off a corresponding portion or all of the upper and lower arms.

22. A power converter as set forth in claim 13, wherein said controller monitors a sequence of one of the on-operations and the off-operations of the switches of the upper and lower arms, when the monitored sequence is an unusual sequence, said controller turning off a corresponding portion or all of the upper and lower arms.

23. A power converter as set forth in claim 13, wherein when the current flywheel duration is not provided, said controller turns off the one of the switches earlier than time to be calculated based on the current flywheel duration.

24. A power converter for a multi-phase electric rotating machine comprising:

a plurality of rectifier modules which work to convert ac current, as produced in the multi-phase electric rotating machine, into dc current, each of the rectifier modules being provided for one of phase windings of the electric rotating machine and disposed between a power supply and the one of the phase windings, each of the rectifier modules being equipped with switches functioning as an upper arm and a lower arm and a controller which controls on- and off-operations of each of the upper and lower arms, the controller controlling the off-operation of one of the upper and lower arms to set a current flywheel duration, in which flywheel current that is current freewheeling from a corresponding one of the phase windings is permitted to flow and which is a time length between when a phase voltage induced at a target one of the phase windings which is associated with the one of the upper and lower arms targeted for the off-operation exceeds a first threshold value and when the phase voltage drops below a second threshold value, to a selected time length following the off-operation of the one of the upper and lower arms.

* * * * *